(12) United States Patent
Hata et al.

(10) Patent No.: US 8,329,135 B2
(45) Date of Patent: *Dec. 11, 2012

(54) ALIGNED CARBON NANOTUBE BULK STRUCTURE HAVING PORTIONS DIFFERENT IN DENSITY

(75) Inventors: Kenji Hata, Ibaraki (JP); Don N. Futaba, Ibaraki (JP); Motoo Yumura, Ibaraki (JP); Sumio Iijima, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/461,808

(22) Filed: Aug. 25, 2009

(65) Prior Publication Data

US 2010/0159222 A1 Jun. 24, 2010

Related U.S. Application Data

(63) Continuation-in-part of application No. 12/087,451, filed as application No. PCT/JP2007/050049 on Jan. 5, 2007, now abandoned.

(30) Foreign Application Priority Data

Jan. 6, 2006 (JP) ................................ 2006-001905

(51) Int. Cl.
*D01F 9/12* (2006.01)
*B32B 0/00* (2006.01)
(52) U.S. Cl. ............... 423/447.2; 423/447.1; 423/447.3; 426/408; 977/742; 977/843

(58) Field of Classification Search .... 423/447.1–447.3, 423/445 B; 977/742–754, 842–848; 428/367
See application file for complete search history.

(56) References Cited

U.S. PATENT DOCUMENTS

2006/0073089 A1* 4/2006 Ajayan et al. .............. 423/447.2

OTHER PUBLICATIONS

Hata, et al., Water-Assisted Highly Efficient Synthesis of Impurity-Free Single-Walled Carbon Nanotubes, Science 2004; 306: 1362-1364.*

* cited by examiner

*Primary Examiner* — Daniel C. McCracken
(74) *Attorney, Agent, or Firm* — Wenderoth, Lind & Ponack, L.L.P.

(57) ABSTRACT

An aligned carbon nanotube bulk structure in which various properties such as density and hardness are controlled depending on the place is provided.

An aligned carbon nanotube bulk structure having different density portions is an aligned carbon nanotube bulk structure provided with a high-density portion applied with a density-increasing treatment and an low-density portion and having a plurality of carbon nanotubes (CNT) aligned in a predetermined direction, in which the structure has 1:3 or more of the degree of anisotropy in the alignment direction and in the direction vertical to the alignment direction and, in the (002) peak of the X-ray diffraction data in the high density region, the intensity of X-ray incident along the orientation direction is higher than that of the X-ray intensity from the direction vertical to the alignment direction, and the degree of alignment is defined by specific conditions.

6 Claims, 14 Drawing Sheets

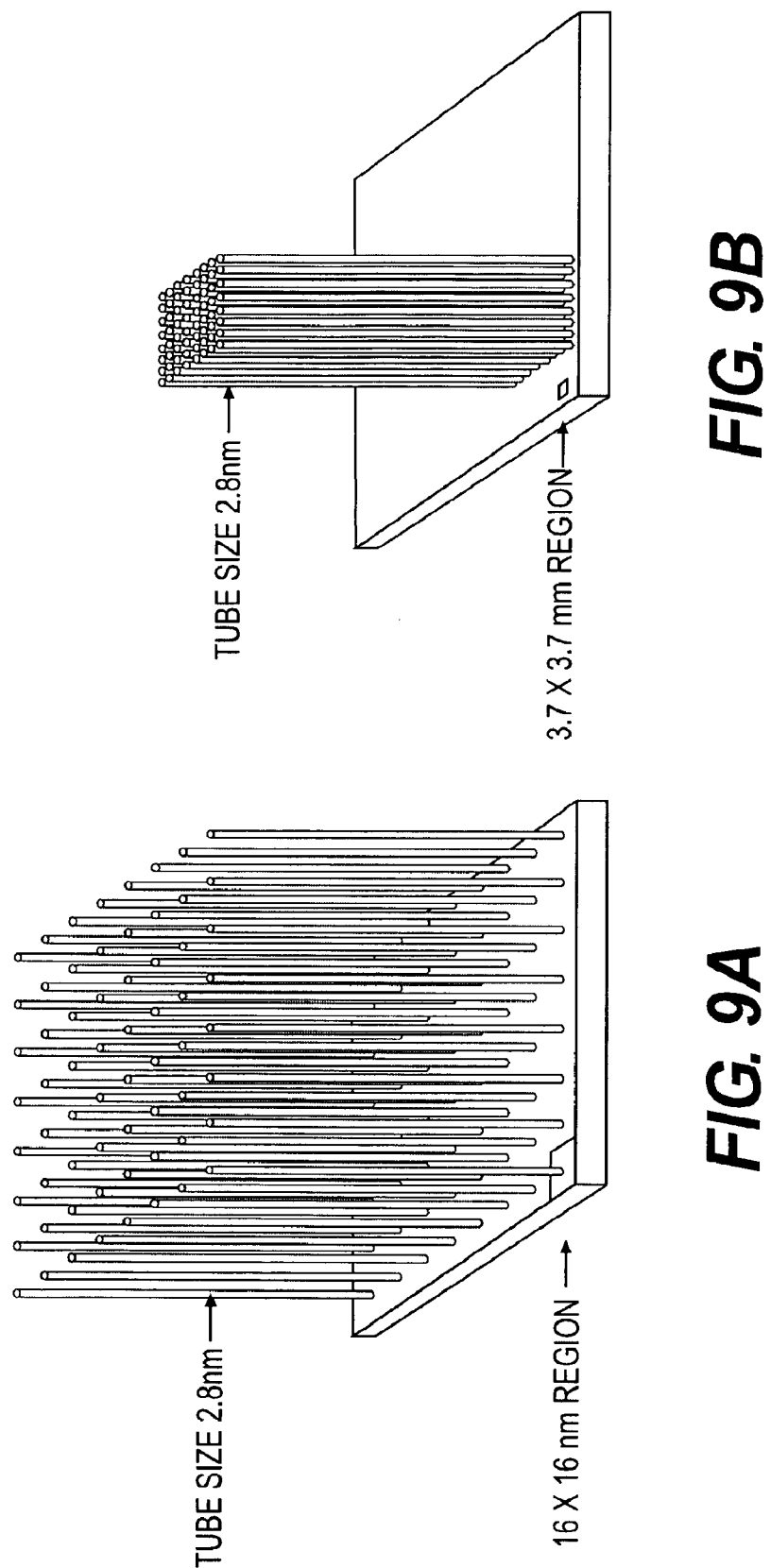

ALIGNED CARBON NANOTUBE BULK STRUCTURE HAVING PORTIONS DIFFERENT IN DENSITY

This application is a continuation-in-part of Ser. No. 12/087,451 filed Oct. 8, 2008 now abandoned, which is a U.S. national stage of International Application No. PCT/JP2007/050049 filed Jan. 5, 2007.

TECHNICAL FIELD

The present invention relates to an aligned carbon nanotube bulk structure having portions different in density. More specifically, the present invention relates to an aligned carbon nanotube bulk structure having portions composed of aligned carbon nanotubes capable of realizing high density, high hardness, high purity, high specific surface area, high electric conductivity, large scaling and patterning, an aspect of which has not hitherto been achieved.

BACKGROUND ART

Regarding carbon nanotubes (CNTs) that are expected for development to functional materials as novel electronic device materials, optical materials, electrically conductive materials, biotechnology-related materials and others, energetic investigations of their yield, quality, use, mass productivity and production method are being promoted.

For putting carbon nanotubes into practical use for the above-mentioned functional materials, one method may be taken into consideration, which comprises preparing a bulk aggregate of a large number of carbon nanotubes, large-scaling the size of the bulk aggregate, and improving its properties such as the purity, the specific surface area, the electric conductivity, the density and the hardness to thereby make it patternable in a desired shape. In addition, the mass productivity of carbon nanotubes must be increased greatly.

To solve the above-mentioned problems, the inventors of this application have assiduously studied and, as a result, have found that, in a process of chemical vapor deposition (CVD) where carbon nanotubes are grown in the presence of a metal catalyst, when a very small amount of water vapor is added to the reaction atmosphere, then an aligned carbon nanotube bulk aggregate having a high purity and having extremely large-scaled as compared with that in conventional methods can be obtained, and have reported it in Non-Patent Document 1, etc.

Non-Patent Document 1: Kenji Hata et al., Water-Assisted Highly Efficient Synthesis of Impurity-Free Single-Walled Carbon Nanotubes, SCIENCE, 2004 Nov. 19, Vol. 306, pp. 1362-1364.

DISCLOSURE OF THE INVENTION

Problems to be Solved by the Invention

The aligned carbon nanotube bulk aggregate reported in the above-mentioned Non-Patent Document 1 has, for example, a purity before purification of 99.98 mass % and a specific surface area of about 1000 m$^2$/g, and has a height (length) of about 2.5 mm or so, which comprises a large number of single-walled carbon nanotubes growing as aggregated on a substrate.

However, in order to apply the aligned carbon nanotube bulk aggregate as a functional material having much better properties, its strength and hardness must be further improved since the density of the structure of the above-mentioned report must is about 0.03 g/cm$^3$ or so and it is mechanically brittle. In addition, there is room for further investigation of the structure in point of the handlability and the workability thereof.

When a patterned aligned carbon nanotube bulk structure is applied to various articles that utilize its electric properties, thermal properties, mechanical properties, gas absorbability, or the like, in some cases, it is preferably used as a bulk structure of which the properties such as the density and the hardness are controlled in sites thereof. In addition, the shape of the aligned carbon nanotube bulk structure is also desired to be readily controllable to a desired shape, while keeping the excellent properties that the carbon nanotubes have. In fact, however, the aligned carbon nanotube bulk structures heretofore proposed could not satisfy the requirements.

With the background described above, therefore, an object of the present application is to provide an aligned carbon nanotube bulk structure of which the properties such as the density and the hardness are controlled in sites thereof, and to provide its production process and its sue.

Another object of the present application is to provide an aligned carbon nanotube bulk structure capable being readily patterned in a desired shape while keeping the excellent properties that the carbon nanotubes have.

For the purpose of solving the foregoing problems, this application provides the following inventions.

[1] An aligned carbon nanotube bulk structure having a plurality of carbon nanotubes (CNTs) having a high density portion applied with a density-increasing treatment and a low density portion and having alignment in a predetermined direction in which, a degree of anisotropy between the direction of alignment and the direction vertical to said direction of alignment in the structure is 1:3 or more, and the intensity by irradiating X-rays along the direction of alignment is higher compared with the intensity by irradiating X-rays from the direction vertical to the direction of alignment at a (002) peak of X-ray diffraction data of the high density portion, and the degree of alignment is defined by at least one of the conditions;

1) in a case of measuring the X-diffraction intensity by irradiating X-rays from a first direction parallel with the longitudinal direction of the CNT and a second direction vertical to the first direction (θ-2θ method), an angle θ and a reflection azimuth at which the reflection intensity from the second direction is higher than the reflection intensity from the first direction are present, and an angle θ and a reflection azimuth at which the reflection intensity from the first direction is higher than the reflection intensity from the second direction is present, 2) a diffraction peak pattern exhibiting the presence of anisotropy appears in a case of measuring an X-ray diffraction intensity by a 2-dimensional diffraction pattern image obtained by irradiating X-rays from a direction vertical to the longitudinal direction of CNT (Laue method), and 3) a Herman's orientation factor is larger than 0 and smaller than 1 when using the X-ray diffraction intensity obtained according to the θ-2θ method or the Laue method.

[2] An aligned carbon nanotube bulk structure according to the above (1), wherein the alignment directions of the carbon nanotube in the high-density portion and the low-density portion are different from each other.

[3] An aligned carbon nanotube bulk structure according to the above (1), wherein the high-density portion and the low-density portion are disposed regularly.

[4] An aligned carbon nanotube bulk structure according to the above (1), further provided with a density region different from the high-density portion and the low-density portion.

[5] An aligned carbon nanotube bulk structure according to the above (4), wherein the portion of different density has an intermediate density between the high-density portion and the low-density portion.

[6] An aligned carbon nanotube bulk structure according to the above (1), wherein the density changes continuously from the high-density portion to the low-density portion.

[7] An aligned carbon nanotube bulk structure according to the above (1), wherein the high-density portion has a weight density of 0.2 to 1.5 g/cm$^3$ while the low-density portion has a weight density of 0.001 to 0.2 g/cm$^3$, and the high-density portion has a specific surface area of 600 to 2600 m$^2$/g.

Effect of the Invention

The aligned carbon nanotube bulk structure of the present invention is an unprecedented high-strength aligned carbon nanotube bulk structure having a high-density portion and a low-density portion. The density of the high-density portion is at least about 20 times that of the aligned carbon nanotube bulk aggregate that the inventors of this application proposed in Non-Patent Document 1, and is extremely high (at least 0.2 g/cm$^3$). The hardness of the high-density portion is at least about 100 times that of the previous one and is extremely large; and this is not a material having a soft feeling but is a novel material that exhibits a phase of so-called "solid".

On the contrary, the low-density portion is a material having low density and a soft feeling and small hardness. The aligned carbon nanotube bulk structure is a novel new material having both features of the high-density portion and the low-density portion.

The aligned carbon nanotube bulk structure of the present invention is a highly purified one and its contamination with catalyst and side product is inhibited. Its specific surface area is from 600 to 2600 m$^2$/g or so, and is on the same level as that of typical porous materials, activated carbon and SBA-15. Though ordinary porous materials are insulators, the aligned carbon nanotube bulk structure of the invention has high electric conductivity and, when formed into a sheet, it is flexible. When the aligned carbon nanotube bulk aggregate produced in Non-Patent Document 1 is formed into an aligned carbon nanotube bulk structure, then a material having a carbon purity of at least 99.98% could be produced.

The aligned carbon nanotube bulk structure of the present invention has excellent properties of purity, density, hardness, specific surface area, electric conductivity and workability, and can be large-scaled. Accordingly, the present invention is expected to be applicable to various uses such as a commutator, brush and contact of a micro-motor, a fine cleaning kit (brush-like member) for removing fine dust generated in the industrial process, and the like.

Further, according to the process for producing an aligned carbon nanotube bulk structure of the present invention, an aligned carbon nanotube bulk structure, which has excellent properties as above and which is expected to be acceptable in various applications, can be produced with good producibility according to a simple method of chemical vapor deposition (CVD).

BRIEF DESCRIPTION OF THE DRAWINGS

FIG. 9 shows images indicating the change the appearance of plural aligned carbon nanotubes before exposure to liquid and after exposure to liquid followed by drying.

BEST MODE FOR CARRYING OUT THE INVENTION

Figure 1A:
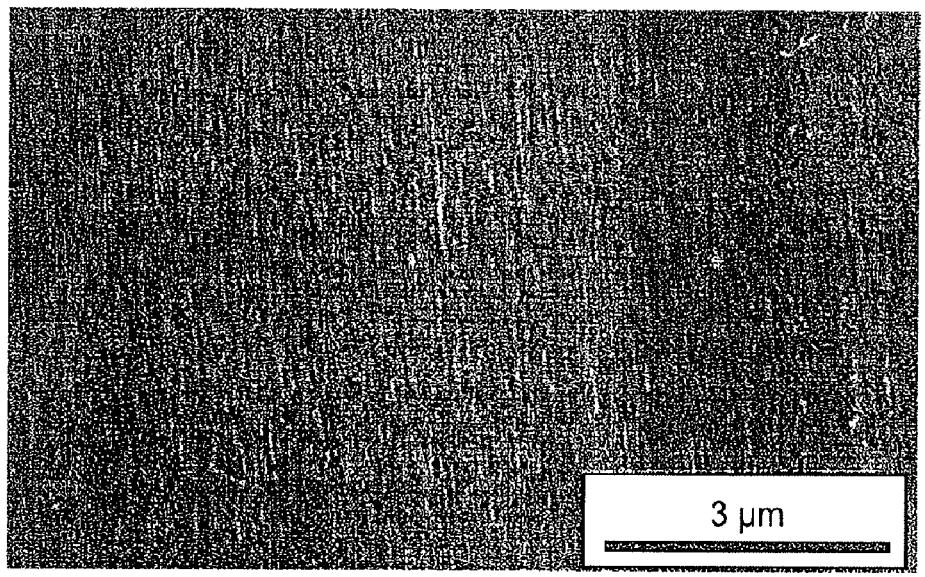
FIG. 1 shows electron microscopic (SEM) images of a high-density portion of an aligned carbon nanotube bulk structure.

The present invention has the above-mentioned characteristics, and its embodiments will be described hereinunder.

The aligned carbon nanotube bulk structure of the present invention is one produced by patterning an aligned carbon nanotube bulk aggregate where plural carbon nanotubes are aligned in a predetermined direction, and is characterized by comprising a high-density portion and a low-density portion.

Typical embodiments of the aligned carbon nanotube bulk structure are the following:

<1> It comprises a high-density portion and a low-density portion, in which the lowermost limit of the density of the high-density portion is 0.2 g/cm$^3$, more preferably 0.3 g/cm$^3$, even more preferably 0.4 g/cm$^3$, the uppermost limit thereof is 1.0 g/cm$^3$, more preferably 1.2 g/cm$^3$, even more preferably 1.5 g/cm$^3$; and the lowermost limit of the density of the low-density portion is 0.001 g/cm$^3$, more preferably 0.005 g/cm$^3$, even more preferably 0.01 g/cm$^3$, the uppermost limit thereof is 0.05 g/cm$^3$, more preferably 0.1 g/cm$^3$, even more preferably 0.2 g/cm$^3$.

<2> In the above <1>, the structure has one or more intermediate-density portions falling between the high-density portion and the low-density portion.

Further, since the intermediate density portion is present, the low-density portion and the high-density portion can maintain an integral structure at the boundary.

<3> The density continuously changes between the highest-density portion where the lowermost limit of the density is 0.2 g/cm$^3$, more preferably 0.3 g/cm$^3$, even more preferably 0.4 g/cm$^3$ and the uppermost limit thereof is 1.0 g/cm$^3$, more preferably 1.2 g/cm$^3$, even more preferably 1.5 g/cm$^3$; and the lowest-density portion where the lowermost limit of the density is 0.001 g/cm$^3$, more preferably 0.005 g/cm$^3$, even more preferably 0.01 g/cm$^3$ and the uppermost limit thereof is 0.05 g/cm$^3$, more preferably 0.1 g/cm$^3$, even more preferably 0.2 g/cm$^3$.

Since the density changes continuously, the low-density portion and the high-density portion are bound while maintaining the integral structure at the boundary.

<4> The density stepwise changes between the highest-density portion where the lowermost limit of the density is 0.2 g/cm$^3$, more preferably 0.3 g/cm$^3$, even more preferably 0.4 g/cm$^3$ and the uppermost limit thereof is 1.0 g/cm$^3$, more preferably 1.2 g/cm$^3$, even more preferably 1.5 g/cm$^3$, and the lowest-density portion where the lowermost limit of the density is 0.001 g/cm$^3$, more preferably 0.005 g/cm$^3$, even more preferably 0.01 g/cm$^3$ and the uppermost limit thereof is 0.05 g/cm$^3$, more preferably 0.1 g/cm$^3$, even more preferably 0.2 g/cm$^3$.

The aligned carbon nanotube bulk structure of the present invention is expected to be applicable to various fields such as optical field, electric and electronic field, machinery field and energy storage field capable of utilizing the characteristics of the high-density portion of carbon nanotubes and those of the low-density portion thereof.

Figure 1B:
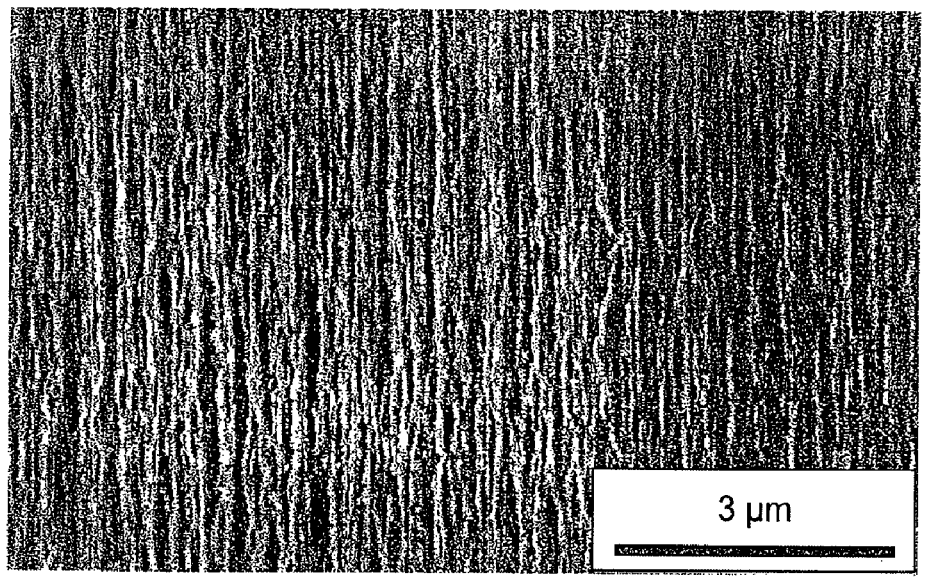

The density range of the high-density portion of the aligned carbon nanotube bulk structure of the present invention is a range necessary for making the structure have a sufficient mechanical strength; and the high-density portion of the aligned carbon nanotube bulk structure having such a density is not a soft-feeling material but exhibits a phase of so-called "solid". The density of the high-density portion is extremely larger than the density of heretofore-proposed aligned carbon nanotube bulk structures. FIG. 1 shows an electron microscopic (SEM) image (a) of a high-density portion of an aligned carbon nanotube bulk structure of the present invention, as compared with a photographic image (b) of an aligned carbon nanotube bulk aggregate produced in Non-Patent Document 1 (hereinafter this may be referred to as previously-proposed aligned carbon nanotube bulk structure). In this example, the density of the high-density portion of the aligned carbon nanotube bulk structure of the present invention is about 20 times larger than the density of the previously-proposed aligned carbon nanotube bulk structure.

The density range of the low-density portion of the aligned carbon nanotube bulk structure of the present invention is a range that makes it possible to utilize properties different from those of the high-density portion.

The definition for the alignment and the degree of alignment of the aligned carbon nanotube bulk structure obtained by applying the density-increasing treatment are to be described below.

In a case where individual CNTs constituting a CNT aggregate are aligned in a regular direction, the directionality for the function of the individual CNTs can be made uniform and, as a result, an aligned carbon nanotube bulk structure of high function can be obtained. That is, the aligned carbon nanotube bulk structure of the invention in which individual CNTs are aligned in a regular direction shows higher directionality for the transmission property in view of the alignment direction when compared with a CNT aggregate in which the direction of individual CNTs is irregular, that is, not aligned. By virtue of the high directionality, the aligned carbon nanotube bulk structure exhibits better electric property (for example, higher electric conductivity), better mechanical property (for example, higher strength), and better thermal property (for example, higher heat conductivity). Further, the property of the aligned carbon nanotube bulk structure which is different between the aligned direction and other direction, that is, the anisotropy is effective, for example, in a case where heat or the like is intended to be diffused or discharged selectively in a desired direction and this is suitable for an application use such as a heat conduction material. Further, since ions can easily diffuse between each of aligned CNTs, this is useful also as an electrode material for a high power super capacitor.

Alignment of the aligned carbon nanotube bulk structure can be evaluated by at least one of the following methods 1 to 3.

1. In a case of measuring an X-ray diffraction intensity by irradiating X-rays from a first direction parallel with the longitudinal direction of CNTs and a second direction vertical to the first direction (θ-2θ method), angle θ and reflection azimuth at which the reflection intensity from the second direction is higher than the reflection intensity from the first direction are present, and angle θ and reflection azimuth at which the reflection intensity from the first direction is higher than the reflection intensity from the second direction.

2. In a case of measuring an X-ray diffraction intensity on a 2-dimensional diffraction pattern image obtained by irradiating X-rays from the direction vertical to the longitudinal direction of CNTs (Lane method), a diffraction peak pattern exhibiting the presence of anisotropy appears.

3. A Herman's orientation factor is greater than 0 and smaller than 1 and, more preferably, greater than 0.25 or more and 1 or less when using the X-ray diffraction intensity obtained by the θ-2θ method or the Laue method.

Further, it is also characterized in that the degree of the diffraction peak intensity of the (CP) diffraction peak and a (002) peak attributable to packing between single-walled CNTs and the diffraction peak intensities of the (100), (110) peaks attributable to the carbon six-membered ring structure constituting the CNT are different between the parallel and vertical incident directions. For detailed description of the experiment, a patent document (U.S. Ser. No. 12/318,443) or (U.S. Ser. No. 11/658,577) may be referred to for instance.

CNTs in the aligned carbon nanotube bulk structure having such properties are aligned.

Further, the degree of alignment of the aligned nanotube bulk structure is evacuated, for example, based on the Herman's orientation factor.

The Herman's orientation factor F is defined by the following formulae:

$$F \equiv \frac{1}{2}(3\langle\cos^2\phi\rangle - 1) \quad \text{[Formula 1]}$$

$$\langle\cos^2\phi\rangle = \frac{\int_0^{\pi/2} I(\phi)\cos^2\phi\sin\phi d\phi}{\int_0^{\pi/2} I(\phi)\sin\phi d\phi}$$

in which φ represents an azimuthal angle with φ=0 being as a reference azimuth, and I(φ) represents a diffraction intensity function (intensity profile). It is preferred to define the aligned direction as the reference azimuth which is the direction where the Herman's orientation factor is at the maximum.

For the Herman's orientation factor, F=1 in a case of complete alignment and F=0 in a case of non-alignment for the direction: φ=0.

Specifically, the Herman's orientation factor may be calculated by using an X-ray diffraction intensity obtained according to the θ-2θ method or the Laue method, or a diffraction intensity function (intensity profile) obtained from an image obtained by Fast Foulier Transformation of an SEM image or an atomic force microscope (hereinafter also referred to as AMF) image.

The orientation property can be quantitatively evaluated also by calculating the Herman's orientation factor using, as a variant, a transformation intensity in the FFT image based on the SEM image, etc. for the aligned CNT structure. In this case, the transformation intensity is determined from the reference direction (φ=0) to φ=π/2 in the radial direction while keeping an equal distance from the original point of the FFT image and this is defined as a diffraction intensity function. The diffraction intensity function exhibits the degree of the periodicity corresponding to the distance from the original point in the direction of the azimuthal angle. The degree of alignment in the reference direction can be evaluated quantitatively by calculating the formula described above using the diffraction intensity function as a variant. For the details of the calculation, the patent document [U.S. Ser. No. 12/318, 443] or [U.S. Ser. No. 11/658,577] may be referred to for instance.

In the aligned carbon nanotube bulk structure, it is desired that the Herman's factor is more than 0 and less than 1, more preferably, 0.25 or more and 1 or less. An aligned carbon nanotube bulk structure within the range of alignment shows good electric property, good mechanical property, and good thermal property, has large specific surface area, favorable integrity, can be handled easily, and also has good shape workability. In addition, it also shows sufficient thermodynamical, electric, or mechanical anisotropy and is suitable to various application uses.

On the contrary, an aligned carbon nanotube bulk structure having the Herman's orientation factor of less than 0 exhibits no degree of alignment. Further, in those having a Herman's orientation factor of less than 0.25, inclination of CNT is 45° and the effect of alignment is decreased. An aligned CNT structure having the Herman's orientation factor of 1 is completely aligned.

The aligned carbon nanotube bulk structure may also contain a plurality of portions of different alignment directions and, for example, the alignment direction may be different between the low-density portion and the high-density portion.

Figure 2:
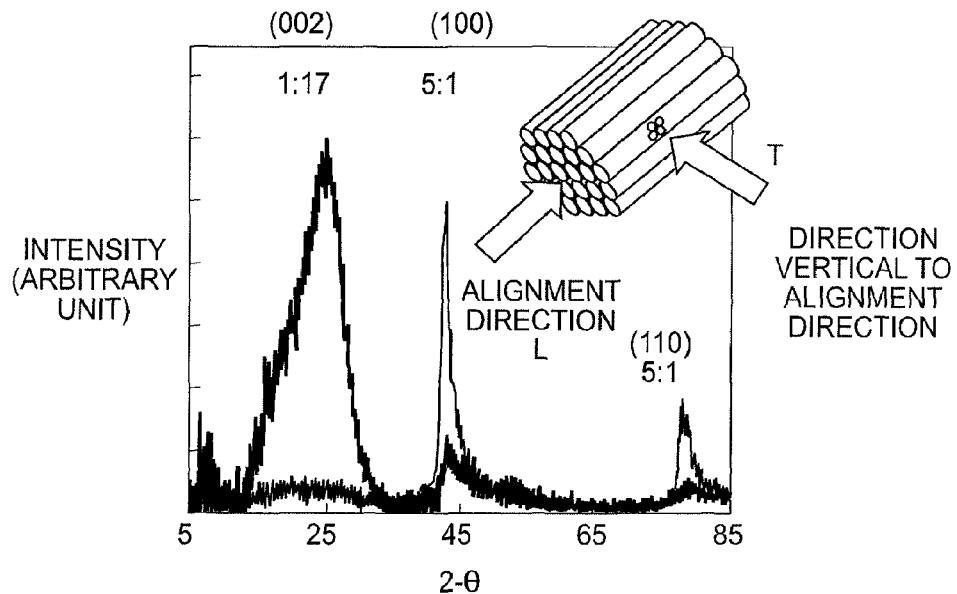
FIG. 2 shows X-ray diffraction data of a high-density portion of an aligned carbon nanotube bulk structure.

FIG. 2 shows X-ray diffraction data of one example of a high-density portion of an aligned carbon nanotube bulk structure of the present invention. In the drawing, indicates the data of the aligned carbon nanotube bulk structure irradiated with X rays in the alignment direction; and T indicates the data thereof irradiated with X rays in the direction vertical to the alignment direction. Samples were so produced that the thickness of the aligned carbon nanotube bulk structure is the same both in the T direction and the L direction, and compared with each other. The intensity ratio of the (100), (110) and (002) diffraction peaks in the L direction and the T direction of the X-ray diffraction data confirms good alignment. Regarding the (100) and (110) peaks, the intensity is higher in the case of X ray irradiation in the direction vertical to the alignment direction (T direction) than in the case of X ray irradiation in the alignment direction (L direction); and the intensity ratio is, for example, in the case of FIG. 2, 5:1 at both the (100) peak and the (110) peak. This is because, in the case of X ray irradiation in the direction vertical to the alignment direction (T direction), the graphite lattices constituting carbon nanotubes are seen. On the contrary, in the case of the (002) peak by X ray irradiation in the alignment direction (L direction), the intensity is higher than that in the case of X ray irradiation in the direction vertical to the alignment direction (T direction); and the intensity ratio is, for example, in the case of FIG. 2, 17:1. This is because, in the case of X ray irradiation in the alignment direction (L direction), the contact points of carbon nanotubes are seen.

The result described above exhibits that the CNTs constituting the aligned carbon nanotube bulk structure are aligned. Further, distinct anisotropy shown by the (002) peak exhibits that CNTs are adjacent to each other, that is, CNTs are filled at a high density.

Figure 3:
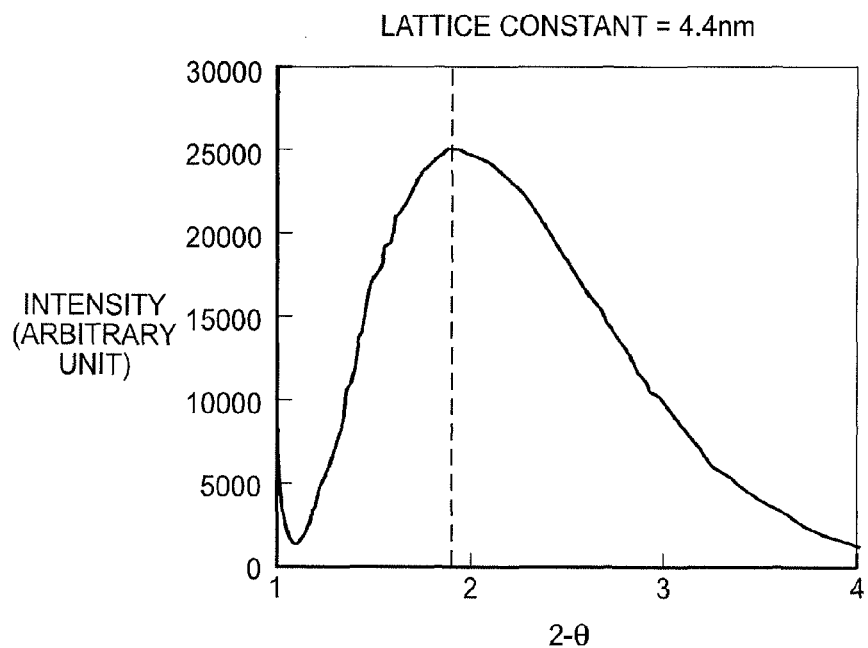
FIG. 3 shows an example of low-angle X-ray diffraction data in a case where a high-density portion of an aligned carbon nanotube bulk structure is irradiated with X rays in the direction vertical to the alignment direction.

FIG. 3 shows an example of low-angle X-ray diffraction data in a case where a high density portion of an aligned carbon nanotube bulk structure of the present invention is irradiated with X rays in the alignment direction (L direction). It is known that the case of this example is a structure having a lattice constant of about 4.4 nm.

This exhibits that an average spacing between each of neighboring CNTs is 4.4 nm, and that CNTs in the carbon nanotube bulk structure have a uniform nanostructure.

The high-density portion of the aligned carbon nanotube bulk structure of the invention scarcely contains scarce pores or voids at the micro scale and is increased in the density over the entire portion. Whether the aligned carbon nanotube bulk structure is increased in the density or not can be judged depending on the pore diameter. The nanosize pore diameter of the aligned carbon nanotube bulk structure can be determined based on the adsorption/desorption isothermal curves of liquid nitrogen at 77K. As a theoretical formula for determining the distribution of pore diameter, a BJH method that assumes the pore as a cylindrical shape (refer to the Journal of J. Amer. Chem. Soc., Vol 73 (1951), p. 373) may be used. The distribution of pore diameter defined in the present specification is determined according to the BJH method based on the adsorption/desorption isothermal curves of liquid nitrogen at 77K.

In the aligned carbon nanotube bulk structure in which a plurality of aligned CNTs are filled at a high density, the pore diameter determined according to the BJH method is mainly within a range of 10 nm or less. This exhibits that the spacing (pore) between each of neighboring single-walled CNTs is 10 nm or less, CNTs are filled at a high density in the aligned carbon nanotube bulk structure, and pores or voids at the micro scale are scarcely present. Such portion exhibits a phase of so-called "solid" and can be used as a handle of a brush-like member.

In the low-density portion of the aligned carbon nanotube bulk structure according to the invention, the pore diameter determined by the BJH method is preferably within a range mainly of 5 nm to 100 nm. This shows that a plurality of spacings (pores) of 3 nm to 100 nm are present between neighboring single-walled CNTs to each other. Such portion forms a material having a soft feeling and can be used suitably, for example, as a brush-like member.

The carbon nanotubes that constitute the aligned carbon nanotube bulk structure of the present invention may be single-walled carbon nanotubes or double-walled carbon nanotubes, or may also be in the form of a mixture of single-walled carbon nanotubes and double-walled or more multi-walled carbon nanotubes in a suitable ratio.

Regarding the production process for the aligned carbon nanotube bulk structure of the present invention, the structure may be produced according to the process of the invention as mentioned later, and its details are described hereinunder. In case where the aligned carbon nanotube bulk structure obtained according to the process is used in an application in which the purity thereof is taken into consideration, its purity can be preferably at least 98 mass %, more preferably at least 99 mass %, even more preferably at least 99.9 mass %. When the production process that the inventors of this application proposed in Non-Patent Document 1 is utilized, then an aligned carbon nanotube bulk structure having a high purity as above can be obtained even though it is not processed for purification. The aligned carbon nanotube bulk structure having such a high purity contains few impurities, and therefore it may exhibit the properties intrinsic to carbon nanotubes.

The purity as referred to in this description is represented by mass % of carbon nanotubes in a product. The impurity May be obtained from the data of elementary analysis with fluorescent X rays.

A preferred range of the height (length: dimension of carbon nanotubes in the lengthwise direction) of the aligned carbon nanotube bulk structure of the present invention varies, depending on the application thereof. In case where it is used as a large-scaled one, the lowermost limit of the range is preferably 5 μm, more preferably 10 μm, even more preferably 20 μm; and the uppermost limit thereof is preferably 2.5 mm, more preferably 1 cm, even more preferably 10 cm.

The aligned carbon nanotube bulk structure of the present invention has an extremely large specific surface area, and its preferred value varies depending on the use of the structure. For applications that require a large specific surface area, the specific surface area is preferably from 600 to 2600 $m^2/g$, more preferably from 800 to 2600 $m^2/g$, even more preferably from 1000 to 2600 $m^2/g$. The carbon nanotube material of the present invention that is unopened preferably has a specific surface area of from 600 to 1300 $m^2/g$, more preferably from 800 to 1300 $m^2/g$, even more preferably from 1000 to 1300 $m^2/g$. The carbon nanotube material of the present invention that is opened preferably has a specific surface area of from 1300 to 2600 $m^2/g$, more preferably from 1500 to 2600 $m^2/g$, even more preferably from 1700 to 2600 $m^2/g$.

The specific surface area may be determined through computation of adsorption/desorption isothermal curves. One example is described with reference to 50 mg of an aligned carbon nanotube bulk aggregate of the present invention. Using BELSORP-MINI (manufactured by Bell Japan, Inc.), liquid nitrogen adsorption/desorption isothermal curves were drawn at 77 K (see FIG. 4). (The adsorption equilibrium time was 600 seconds). The specific surface area was computed from the adsorption/desorption isothermal curves, and it was about 1100 $m^2/g$. In the relative pressure region of at most 0.5, the adsorption/desorption isothermal curves showed linearity, and this confirms that the carbon nanotubes in the aligned carbon nanotube bulk structure are unopened.

Figure 4:
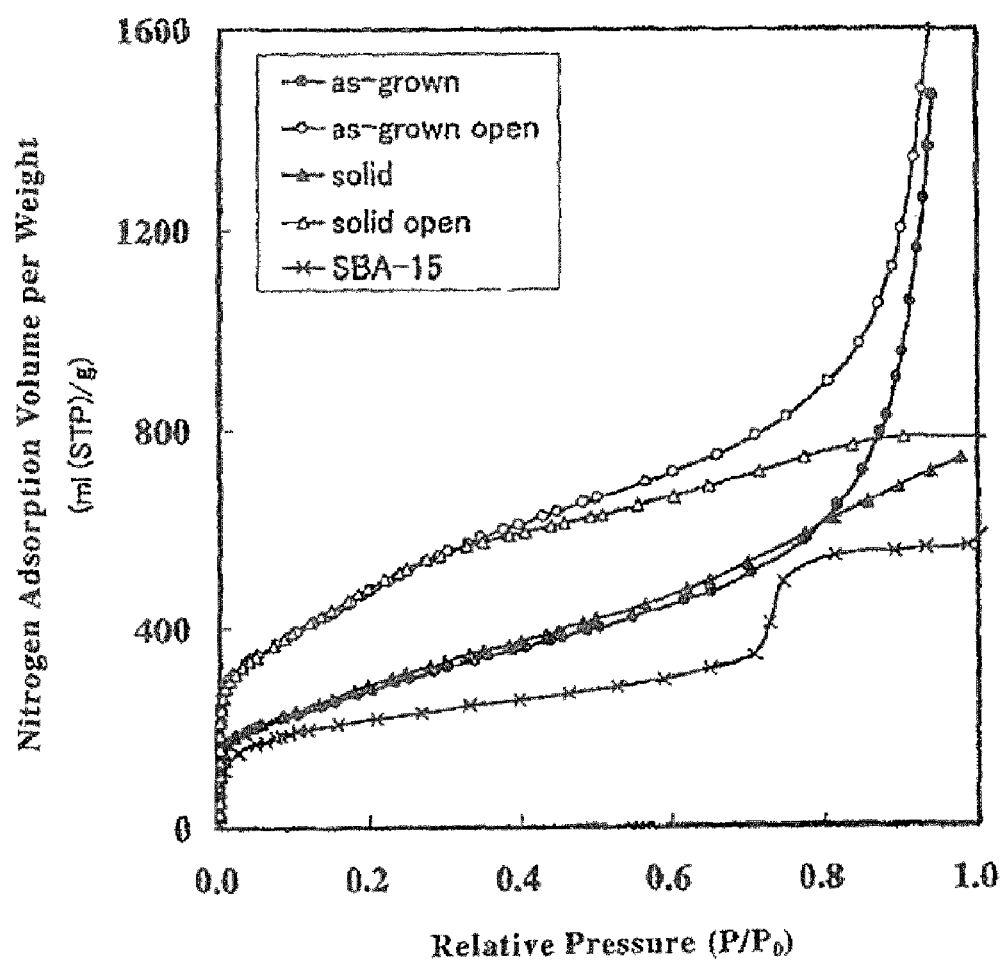
FIG. 4 shows liquid nitrogen adsorption/desorption isothermal curves of a high-density portion of an aligned carbon nanotube bulk structure.

When the aligned carbon nanotube bulk structure of the present invention is processed for opening, then the top end of the carbon nanotube is opened to thereby increase the specific surface area thereof. In FIG. 4, ▲ indicates the data of an unopened aligned carbon nanotube bulk structure of the present invention; Δ indicates the data of an opened one thereof; ● indicates the data of an unopened, previously-proposed aligned carbon nanotube bulk aggregate; ○ indicates the data of an opened one thereof; x indicates the data of mesoporous silica (SBA-15). The opened aligned carbon nanotube bulk structure of the present invention realized an extremely large specific surface area of about 1900 $m^2/g$.

Figure 5:
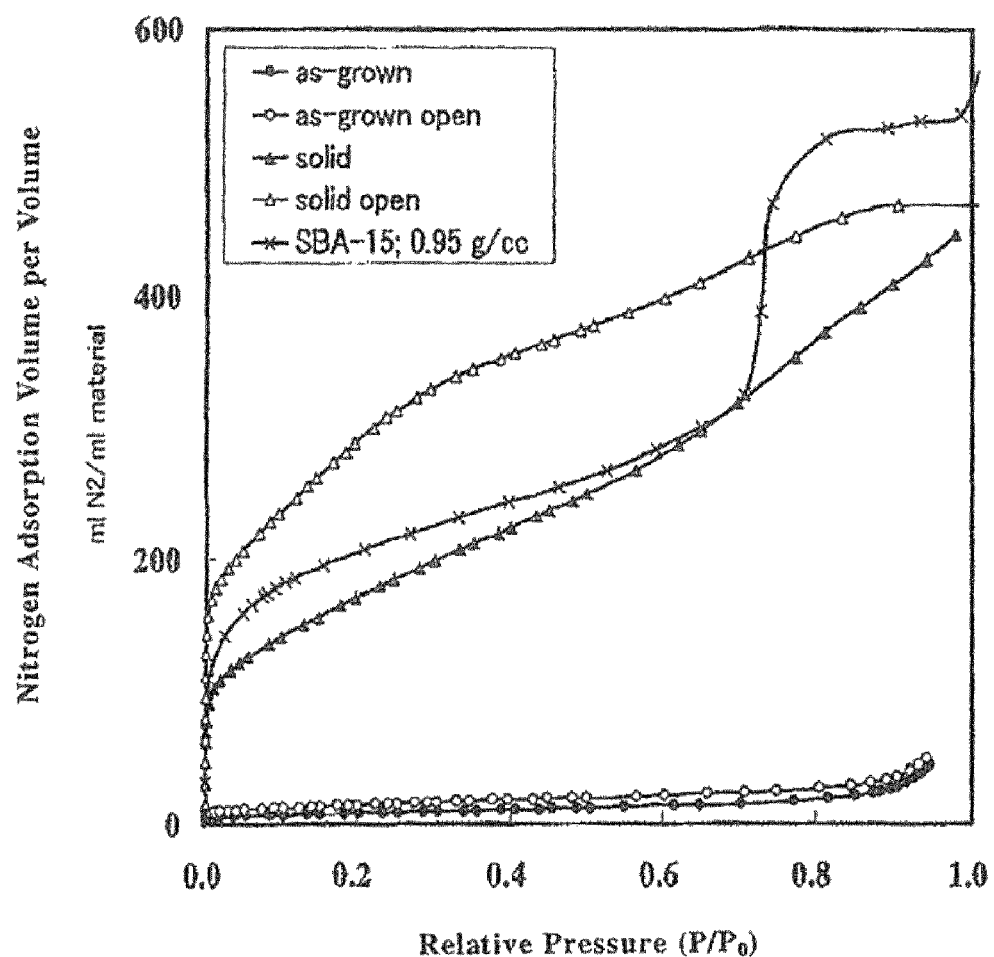
FIG. 5 shows the adsorption amount per unit volume of a high-density portion of an aligned carbon nanotube bulk structure.
Figure 6:
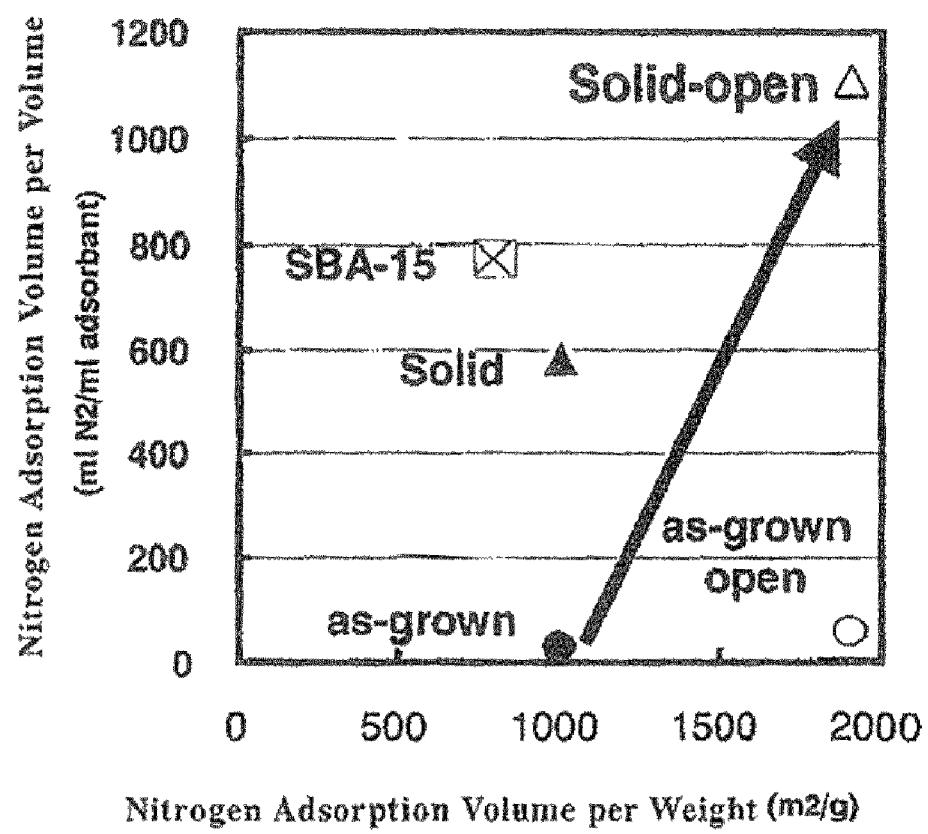
FIG. 6 shows a relation between the adsorption amount per unit volume of a high-density portion of an aligned carbon nanotube bulk structure and the specific surface area per unit weight thereof.

FIG. 5 shows the adsorption amount per unit volume; and FIG. 6 shows a relation between the adsorption amount per unit volume and the specific surface area per unit weight. From these drawings, it is known that the aligned carbon nanotube bulk structure of the present invention has a large specific surface area and good adsorption capability.

For the opening treatment, employable is a dry process of treatment with oxygen, carbon dioxide or water vapor. In case where a wet process is employable for it, it may comprise treatment with an acid, concretely refluxing treatment with hydrogen peroxide or cutting treatment with high-temperature hydrochloric acid.

The aligned carbon nanotube bulk aggregate having such a large specific surface area exhibits great advantages in various applications of electrode materials, batteries, capacitors, supercapacitors, electron emission devices, field emission type displays, adsorbents, gas storages, etc., to which the large specific surface area is utilized effectively. When the specific surface area is too small and when the aggregate having such a small specific surface area is used in the above-mentioned applications, then the devices could not have desired properties. The uppermost limit of the specific surface area is preferably as high as possible, but is theoretically limited.

For the reason that the aligned carbon nanotube bulk structure of the invention has an extremely large specific surface area, it is considered that the structure has the following conditions.

1. The aligned carbon nanotube bulk structure comprises single-walled CNTs.

An aligned CNT structure comprising multi-walled CNTs has an extremely decreased specific surface area since nitrogen atoms cannot diffuse between carbon layers of CNTs. For example, the specific surface area of a double-walled aligned CNT structure is about one-half of that of the single-walled aligned CNT structure. For obtaining a specific surface area exceeding 1000 $m^2/g$, it is necessary that the content of the single-layered CNT in the aligned CNT structure is 50% or more.

2. CNTs constituting the aligned CNT structure have a high purity.

In order to obtain a large specific surface area, it is desirable that the purity of CNT is as high as possible. The purity referred to herein includes a carbon purity and an absolute purity. The carbon purity shows the weight percentage of carbon constituting the aligned carbon nanotube bulk structure. The absolute purity shows the weight percentage of CNTs constituting the aligned carbon nanotube bulk structure. An aligned carbon nanotube bulk structure with more deposition of carbon impurity has lower absolute purity though the carbon purity is high.

While there is no uppermost limit for the carbon purity in order to obtain a large specific surface area, it is difficult to obtain an aligned CNT structure at 99.9999% or higher with a view point of production. In a case where the carbon purity is less than 95%, it is difficult to obtain a specific surface area exceeding 1000 $m^2/g$ in a case of unopened CNTs.

Since the specific surface area of the carbon impurity is extremely small, it is necessary that the absolute purity is high in order to obtain a large specific surface area. In a case where the absolute purity is lower than 90%, it is difficult to obtain a specific surface area exceeding 1000 $m^2/g$ in a case of unopened CNTs.

3. The average outer diameter of the single-walled CNTs constituting the aligned carbon nanotube bulk structure is large, and the half-width value representing the range of the outer diameter distribution is large.

The single-walled CNTs constituting the aligned carbon nanotube bulk structure of the invention comprise single-walled CNTs having a large average outer diameter (2 nm or more) and a wide range for the distribution of outer diameter (half-width value: 1 nm or more), as well as with low linearity (G/D ratio; 50 or less). Accordingly, a spacing capable of diffusing nitrogen atoms is generated between the single-walled CNTs to obtain a large specific surface area. That is, large average outer diameter and wide range for the outer diameter distribution of the single-walled CNTs are suitable for obtaining a number of spacings capable of diffusing nitrogen atoms, that is, a large specific surface are.

The range for the average outer diameter and that for the half-width value of CNTs suitable for obtaining an aligned carbon nanotube bulk structure of a large specific surface area are 1.5 nm or more and 4 nm or less for the average outer diameter and 1 nm or more for the half-width value.

In a case where the average diameter exceeds 4 nm, since the mixed amount of the multi-layered CNT increases, the specific surface area decreases. Further, in a case where the average outer diameter exceeds 4 nm, since the CNT tends to be deformed to a flattened shape, the specific surface area is decreased in a case of opening. In a case where the average outer diameter is less than 1.5 nm, since a number of CNTs tend to adhere with no spacing to each other and form a large bundle, the specific surface area is decreased. Further, in a case where the half-width value is less than 1 nm, that is, the outer diameter of CNTs constituting the aligned CNT structure is uniform, since a number of CNTs adhere with no spacing to each other tending to form a large bundle also in this case, this causes the specific surface area to be decreased. While there is no particular uppermost limit for the half-width value, the half-width value is not larger than twice that of the average outer diameter.

On the contrary, an existent single-walled CNT structure having a small average outer diameter (smaller than 1.5 nm) and a narrow range for the outer diameter distribution (half-width value: less than 0.5 nm), as well as having high linearity (G/D ratio: 50 or more) usually tends to form a bundle in which hundreds to thousands single-walled CNTs are close packed. In this case, nitrogen atoms cannot diffuse through the spacing between CNTs in the bundle to decrease the specific surface area. According to the description, for example, in the Journal of Carbon, Vol. 41 (2003), pp. 1273 to 1280, HiPco single-walled CNTs manufactured by Carbon Nanotechnologies Corp. have an average outer diameter of about 0.75 nm and a half-width value of less than 0.5 nm and also have a high linearity. According to the description in the Journal of Nano Letters, Vol. 2 (2002), pp. 385 to 388, the specific surface area of such HiPco single-walled CNTs is 861 $m^2/g$ even after applying an opening treatment, which is extremely smaller compared with the specific surface area of the aligned carbon nanotube bulk structure of the invention.

4. Linearity (crystallinity) of CNT is low.

The linearity (crystallinity) of CNT can be evaluated by a G/D ratio of Raman spectrum to be detailed later, and a preferred range for the linearity (crystallinity) of CNT for obtaining an aligned CNT structure having a large specific surface area is 1 or more and 50 or less in term of the G/D ratio. The G/D ratio is a ratio between the intensity of a G band peak attributable to the graphite crystal structure observed near 1590 kayser and the intensity of a D band peak attributable to the defect structure, etc. observed near 1340 kayser in the Raman spectrum of the aligned carbon nanotube bulk structure. CNT having a high G/D ratio shows high crystallinity and linearity.

It is considered that those having the G/D ratio of less than 1 have low crystallinity for the single-walled CNT, suffers from much contamination of amorphous carbon or the like, and have much content of multi-walled CNT. On the contrary, in those having the G/D ratio exceeding 50, the linearity is high, single-walled CNTs tend to form a large bundle with less spacing and the specific surface area may possibly be decreased.

According to the descriptions in the Journal of J. Phys. Chem. B, vol. 110 (2006), pp. 5849 to 5853, the G/D ratio of a high quality CNT having high linearity and not containing defect structures is generally 100 or more, and, sometimes, 200 or more. The specific surface area of such CNT is 1000 $m^2/g$ or less.

While it is preferred for the aligned carbon nanotube bulk structure of the invention to satisfy all of the four conditions described above, it is not always necessary to satisfy all of such conditions together and it may suffice that necessary conditions are satisfied appropriately with no excess or deficiency.

The aligned carbon nanotube bulk structure of the present invention may be in the form of a mesoporous material having a packing ratio of from 5 to 50%, more preferably from 10 to 40%, even more preferably from 10 to 30%. In this case, the material preferably contains those having a mesopore diameter of from 1.0 to 5.0 nm. The mesopores in this case are defined by the size thereof in the aligned carbon nanotube bulk structure. When the carbon nanotubes in the aligned carbon nanotube bulk structure are opened through oxidation treatment or the like as in Example 6, and when liquid nitrogen adsorption/desorption isothermal curves of the structure are prepared and SF plots are obtained from the adsorption curves, then the mesopores corresponding to the size of the carbon nanotubes may be computed. On the contrary, from the above-mentioned experimental facts, it is known that the high-density portion of the opened aligned carbon nanotube bulk structure can function as a mesopore material. The packing ratio in the mesopores may be defined by the coating ratio of the carbon nanotubes. When the packing ratio or the mesopore size distribution falls within the above range, then the aligned carbon nanotube bulk structure is favorably used in applications of a mesoporous material and may have a desired strength.

An ordinary mesoporous material is an insulator, but the high-density portion of the aligned carbon nanotube bulk structure of the present invention has high electric conductivity and, when formed into a sheet, it is flexible.

The Vickers hardness of the aligned carbon nanotube bulk structure of the present invention is preferably from 5 to 100 HV. The Vickers hardness falling within the range is a sufficient mechanical strength comparable to that of typical mesoporous materials, active carbon and SBA-15, and exhibits great advantages in various applications that require mechanical strength.

The aligned carbon nanotube bulk structure of the present invention may be provided on a substrate, or may not be thereon. In case where it is provided on a substrate, it may be aligned vertically to the surface of the substrate, or horizontally or obliquely thereto.

Further, the aligned carbon nanotube bulk structure of the present invention preferably shows anisotropy between the alignment direction and the direction vertical thereto, in at least any of optical properties, electric properties, mechanical properties and thermal properties. The degree of anisotropy of the aligned carbon nanotube bulk structure between the alignment direction and the direction vertical thereto is preferably at most 1/3, more preferably at most 1/5, even more preferably at most 1/10. The lowermost limit may be about 1/100. Also preferably, the intensity ratio of any of the (100), (110) and (002) peaks in the alignment direction and in the direction vertical thereto in X-ray diffraction is from 1/2 to 1/100 in terms of the ratio of the small value to the large value. FIG. 2 shows one example of the case. Such a large anisotropy of, for example, optical properties makes it possible to apply the structure to polarizers that utilize the polarization dependency of light absorbance or light transmittance. The anisotropy of other properties also makes it possible to apply the structure to various articles that utilize the individual anisotropy.

Figure 7:
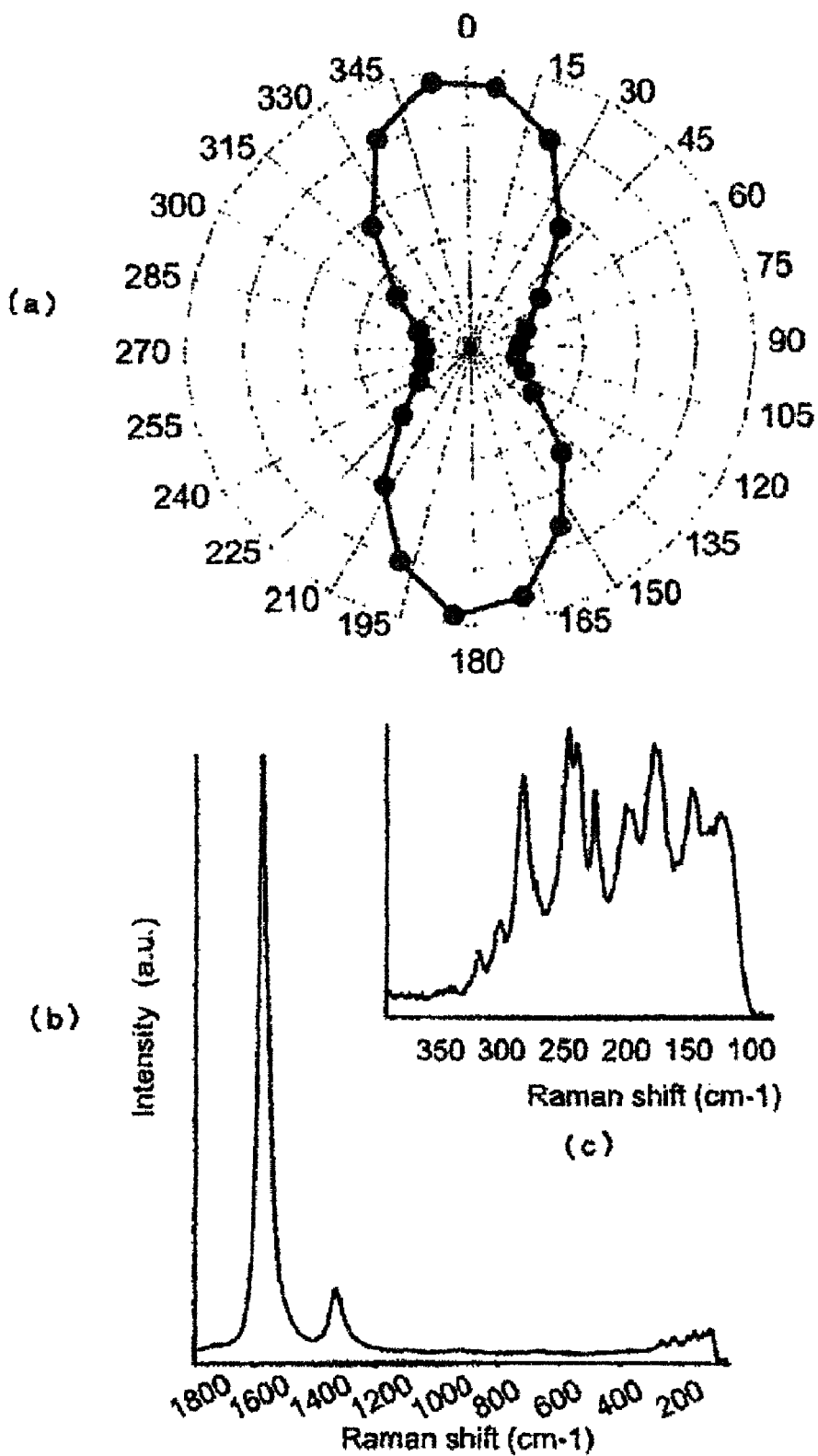
FIG. 7 shows an example of evaluated results of Raman spectrometry of a high-density portion of an aligned carbon nanotube bulk structure.

The quality of the carbon nanotubes (filaments) in the aligned carbon nanotube bulk structure can be evaluated through Raman spectrometry. One example of Raman spectrometry is shown in FIG. 7. In FIG. 7, (a) shows the anisotropy of Raman G band; and (b) and (c) show data of Raman G band. From the drawings, it is known that the G band having a sharp peak is seen at 1592 kayser indicating the presence of a graphite crystal structure. In addition, it is also known that the D band is small therefore indicating the presence of a high-quality graphite layer with few defects. On the short wavelength side, seen are RBM modes caused by plural single-walled carbon nanotubes, and it is known that the graphite layer comprises a single-walled carbon nanotubes. These confirm the existence of high-quality single-walled carbon nanotubes in the aligned carbon nanotube bulk structure of the present invention. Further, it is known that the Raman G band anisotropy differs by 6.8 times between the alignment direction and the direction vertical thereto.

Further, the aligned carbon nanotube bulk structure of the present invention may be patterned in a predetermined shape. The shape includes, for example, thin films, as well as any desired blocks such as columns having a circular, oval or n-angled cross section (n is an integer of at least 3), or cubic or rectangular solids, and needle-like solids (including sharp, thin and long cones). The patterning method is described hereinunder.

Next described is a process for producing the aligned carbon nanotube bulk structure of the present invention.

The process for producing the aligned carbon nanotube bulk structure of the present invention is a process of chemical vapor deposition (CVD) of carbon nanotubes in the presence of a metal catalyst, which is characterized in that plural carbon nanotubes are grown, as aligned, in a reaction atmosphere, and then the resulting plural carbon nanotubes are exposed to liquid and dried thereby giving an aligned carbon nanotube bulk structure comprising a high-density portion having a density of from 0.1 to 1.5 g/m$^3$ and a low-density portion having a density of from 0.002 to 0.2 g/m$^3$.

First described is the method of aligned growth of plural carbon nanotubes through CVD.

Aligned carbon nanotube aggregate as-grown without subjecting a density-increasing treatment is prepared. The aligned carbon nanotube bulk aggregate as-grown referred to in the present specification means an aggregate of a plurality of CNTs grown from a substrate used for growing and it also includes those obtained by peeling the aggregate from the substrate. The aligned carbon nanotube bulk aggregate may be in any shape and form so long as they can be arranged on the substrate and can be suitably applied with the density-increasing step and may be, for example, in a thin plate shape, sheet, foil, or ribbon.

It may suffice that the density of the low-density portion of the aligned carbon nanotube bulk aggregate in a grown state is such an extent that the density-increasing treatment to be described later can be conducted partially and suitably. Specifically, it is preferred that the weight density is within a range from 0.002 g/cm$^3$ to 0.2 g/cm$^3$ or less since the aligned carbon nanotube bulk aggregate in the grown state is not disintegrated when the aggregate is detached from the substrate, and it has such a low density that the density-increasing treatment to be described later can be conducted.

The aligned carbon nanotube bulk aggregate having a low density can be produced by a known chemical vapor phase synthesis method. In this process, a catalyst is prepared on a substrate, and a plurality of CNTs are grown to the catalyst through chemical vapor phase deposition (CVD). The aligned carbon nanotube bulk aggregate having a low density may be produced by growing a plurality of CNTs aligned in a predetermined direction from a catalyst patterned on the substrate by using, for example, a method described in Japanese Patent Applications Nos. 2009-001586 and 2006-527894. While the properties of the aligned carbon nanotube bulk aggregate having a low density produced by the method described in Japanese Patent Applications Nos. 2009-001586 and 2006-527894 depend on the details of production conditions, typical values thereof include a single-walled CNT content of 99% (ratio for the number of single-walled CNTs relative to double-walled CNTs and multi-walled CNTs, which is obtained by observing the synthesized aligned single-walled CNT aggregate by a transmission type electron microscope and determined based on the image), a density of 0.03 g/cm$^3$, a G/D ratio of 2.5 to 40, a BET-specific surface area of 1150 m$^2$/g, an average outer diameter of 2.5 nm, a half-width value of 2 nm, a carbon purity of 99.9%, an absolute purity of 98%, and a Herman's orientation factor of from 0.3 to 0.7.

By subjecting thus produced aligned carbon nanotube aggregate having a low density to a density-increasing treatment partially, the aligned carbon nanotube structure having a high-density portion and a low-density portion of the present invention can be produced.

As the carbon compound for the feedstock carbon source in CVD, usable are hydrocarbons like before, and preferred are lower hydrocarbons such as methane, ethane, propane, ethylene, propylene, acetylene. One or more of these may be used, and use of lower alcohols such as methanol or ethanol and low-carbon oxygen-containing compounds such as acetone or carbon monoxide may also be taken into consideration within an acceptable range for the reaction condition.

The atmospheric gas for reaction may be any one that does not react with carbon nanotubes and is inert at the growth temperature. Its examples include helium, argon, hydrogen, nitrogen, neon, krypton, carbon dioxide, chloride, and their mixed gases; and especially preferred are helium, argon, hydrogen and their mixed gases.

The atmospheric pressure in reaction may be any one falling within a pressure range within which carbon nanotubes can be produced, and is preferably from 10$^2$ Pa to 10$^7$ Pa (100 atmospheres), more preferably from 10$^4$ Pa to 3×10$^5$ Pa (3 atmospheres), even more preferably from 5×10$^4$ Pa to 9×10$^4$ Pa.

As so mentioned in the above, a metal catalyst is made to exist in the reaction system, and the catalyst may be any suitable one heretofore used in production of carbon nanotubes. For example, it includes thin film of iron chloride, thin film of iron formed by sputtering, thin film of iron-molybdenum, thin film of alumina-iron, thin film of alumina-cobalt, thin film of alumna-iron-molybdenum, etc.

The amount of the catalyst may fall within any range heretofore employed in production of carbon nanotubes. For example, when an iron metal catalyst is used, then its thickness is preferably from 0.1 nm to 100 nm, more preferably from 0.5 nm to 5 nm, even more preferably from 1 nm to 2 nm.

Regarding the catalyst positioning, employable is any method of positioning the metal catalyst having a thickness as above, suitable for sputtering deposition.

The temperature in the growth reaction in CVD may be suitably determined in consideration of the reaction pressure, the metal catalyst, the carbon source material, etc.

According to the process of the present invention, a catalyst may be disposed on a substrate, and plural carbon nanotubes may be grown, as aligned vertically to the substrate surface. In this case, any substrate heretofore used in production of carbon nanotubes is employable, for example, including the following:

(1) Metals and semiconductors such as iron, nickel, chromium, molybdenum, tungsten, titanium, aluminium, manganese, cobalt, copper, silver, gold, platinum, niobium, tantalum, lead, zinc, gallium, germanium, indium, arsenic, indium, phosphorus, antimony; their alloys; and oxides of those metals and alloys.

(2) Thin films, sheets, plates, powders and porous materials of the above-mentioned metals, alloys and oxides.

(3) Non-metals and ceramics such as silicon, quartz, glass, mica, graphite, diamond; their wafers and thin films.

For the method of patterning the catalyst, employable is any suitable method capable of directly or indirectly patterning the catalyst metal. It may be a wet process or a dry process; and for example, herein employable are patterning with mask, patterning by nano-inprinting, patterning through soft lithography, patterning by printing, patterning by plating, patterning by screen printing, patterning through lithography, as well as a method of patterning some other material capable of selectively adsorbing a catalyst on a substrate and then making the other material selectively adsorb a catalyst thereby forming a pattern. Preferred methods are patterning through lithography, metal deposition photolithography with mask, electron beam lithography, catalyst metal patterning through electron beam deposition with mask, and catalyst metal patterning through sputtering with mask.

According to the process of the present invention, an oxidizing agent such as water vapor may be added to the reaction atmosphere described in Non-Patent Document 1 thereby growing a large quantity of aligned single-walled carbon nanotubes. Needless-to-say, the invention should not be limited to the process, in which, therefore, any other various processes may be employed.

In the manner as above, an aligned carbon nanotube bulk aggregate before exposed to liquid and dried may be obtained.

The method of peeling the aligned carbon nanotube bulk aggregate from the substrate may be a method of peeling it from the substrate physically, chemically or mechanically. For example, herein employable are a method of peeling it by the action of an electric field, a magnetic field, a centrifugal force or a surface tension; a method of mechanically peeling it directly from the substrate; and a method of peeling it from the substrate under pressure or heat. One simple peeling method comprises picking it up directly from the substrate with tweezers and peeling it. More preferably, it may be cut off from the substrate by the use of a thin cutting tool such as cutter blade. Further, it may be peeled by suction from the substrate, using a vacuum pump or a vacuum cleaner. After peeled, the catalyst may remain on the substrate, and it may be again used in the next step of growing carbon nanotubes. Needless-to-say, the aligned carbon nanotube bulk aggregate formed on the substrate may be directly processed as it is in the next step.

According to the process of the present application, a part of the plural aligned carbon nanotubes produced in the manner as above are exposed to liquid and then dried to give the intended aligned carbon nanotube bulk structure. The shape of the obtained structure may be controlled to various characteristic shapes, depending on the shape of the aligned carbon nanotube bulk aggregate before exposure to liquid, the starting point for exposure to liquid, the amount of the liquid for exposure thereto and the use of a shaping mold.

As a matter of fact, the production process is not restricted to the process described above so long as an aligned carbon nanotube bulk structure having the high-density portion and the low-density portion can be obtained.

A process for producing an aligned carbon nanotube bulk structure having a high-density portion and a low-density portion applied with the density-increasing treatment is to be described specifically. In the process of the invention according to the present application, an aligned carbon nanotube bulk structure having a high-density portion and a low-density portion is obtained by exposing a portion of the aligned carbon nanotube bulk aggregate of a low-density manufactured as described above to a liquid and then drying the same.

The density-increasing treatment is a method of dipping an aligned carbon nanotube bulk aggregate into a liquid having an affinity with CNT, inducing aggregation between CNTs to each other by evaporation of the liquid which impregnates between CNTs and surface tension of the liquid caused thereby and improving the number density of CNTs. Density increase proceeds when the aligned carbon nanotube aggregate impregnated or deposited with the liquid is dried by the density-increasing treatment for the CNT aggregate. It is considered that the phenomenon occurs due to adhesion of neighboring CNTs to each other by the surface tension upon evaporation of the liquid deposited to individual CNTs.

The liquid to which plural aligned carbon nanotubes are exposed is preferably one that has an affinity to carbon nanotubes and does not remain in the carbon nanotubes wetted with it and then dried. The liquid of the type usable herein includes, for example, water, alcohols (isopropanol, ethanol, methanol), acetones (acetone), hexane, toluene, cyclohexane, DMF (dimethylformamide), etc.

For exposing plural aligned carbon nanotubes to the above-mentioned liquid, for example, employable are a method comprising dropwise applying the liquid droplets little by little onto the upper surface of the aligned carbon nanotube aggregate and repeating the operation until the aligned carbon nanotube aggregate is finally completely enveloped by the liquid droplets; a method comprising wetting the surface of the substrate with the liquid by the use of pipette, then infiltrating the liquid into the aligned carbon nanotube aggregate from the point at which the aggregate is kept in contact with the substrate, thereby wetting entirely the aligned carbon nanotube aggregate; a method comprising vaporizing the liquid and exposed the entire aligned carbon nanotube aggregate with the vapor in a predetermined direction; a method comprising spraying the liquid onto the aligned carbon nanotube aggregate so as to wet it with the liquid. For drying the aligned carbon nanotube aggregate after wetted with the liquid, for example, employable is a method of spontaneous drying at room temperature, vacuum drying, or heating on a hot plate or the like.

Figure 8A:
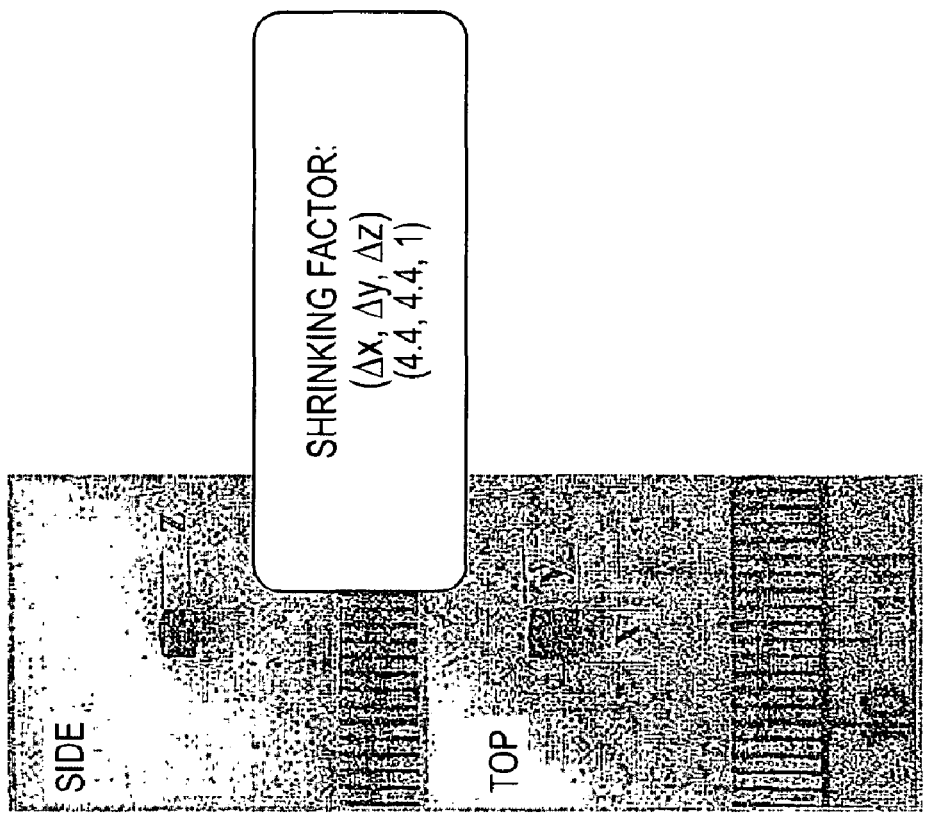
FIG. 8 shows the appearance of plural aligned carbon nanotubes before exposure to liquid and after exposure to liquid followed by drying.
Figure 8B:
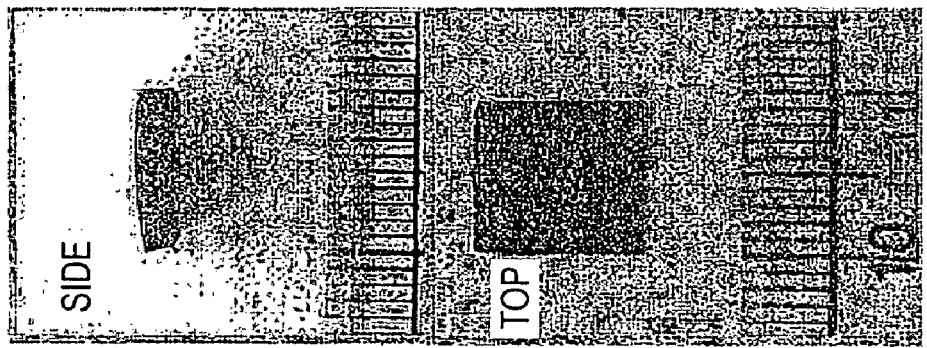

When plural aligned carbon nanotubes are exposed to the liquid, their aggregate may shrink a little and may much shrink when dried, thereby giving an aligned carbon nanotube bulk aggregate having a high density. In this case, the shrinkage is anisotropic, and one example is shown in FIG. 8. In FIG. 8, the left side shows an aligned carbon nanotube bulk aggregate produced according to the process of Non-Patent Document 1; and the right side shows one produced by exposing the aligned carbon nanotube bulk aggregate to water followed by drying. The alignment direction is z direction; and the plane vertical to the alignment direction has x direction and y direction defined therein. The shrinking image is shown in FIG. 9.

When a part of plural aligned carbon nanotubes are exposed to the liquid, the portion may shrink a little and may much shrink when dried, thereby giving an aligned carbon nanotube bulk structure having a high density. In this case, the shrinkage is anisotropic, and one example is shown in FIG. 8. In FIG. 8, the left side shows an aligned carbon nanotube bulk structure produced according to the process of Non-Patent Document 1; and the right side shows the structure (corresponding to the high-density portion) produced by exposing the aligned carbon nanotube bulk structure to water followed by drying. The alignment direction is z direction; and the plane vertical to the alignment direction has x direction and y direction defined therein. The shrinking image is shown in FIG. 9. Further, during exposure to solution, when weak external pressure is applied thereto, then the shape of the aligned carbon nanotube bulk structure may be controlled. For example, when the bulk structure is dipped in solution and dried while weak pressure is applied thereto in the x direction vertical to the alignment direction, then an aligned carbon nanotube bulk structure shrunk mainly in the x direction may be obtained. Similarly, when the solution dipping and drying is effected while weak pressure is applied obliquely to the alignment direction z, then a thin-filmy aligned carbon nanotube bulk structure shrunk mainly in the z direction may be obtained. The aligned carbon nanotube bulk structure may be processed according to the above process, after it is removed from the substrate on which it has grown, then it is placed on another substrate. In this case, it is possible to produce an aligned carbon nanotube bulk structure having high adhesiveness to any desired substrate. For example, in case where a thin-filmy aligned carbon nanotube bulk structure is formed on a metal, then it may have high electric conductivity adjacent to a metal electrode, and for example, it may be favorably utilized in an application of electroconductive materials for heater or capacitor electrodes. In this case, the pressure may be weak in such a level of picking up with tweezers, and it does not cause damage to the carbon nanotubes. Pressure alone could not compress the bulk structure to have the same degree of shrinkage not causing damage to the carbon nanotubes, and it is extremely important to use solution for producing a favorable aligned carbon nanotube bulk structure.

Figure 10:
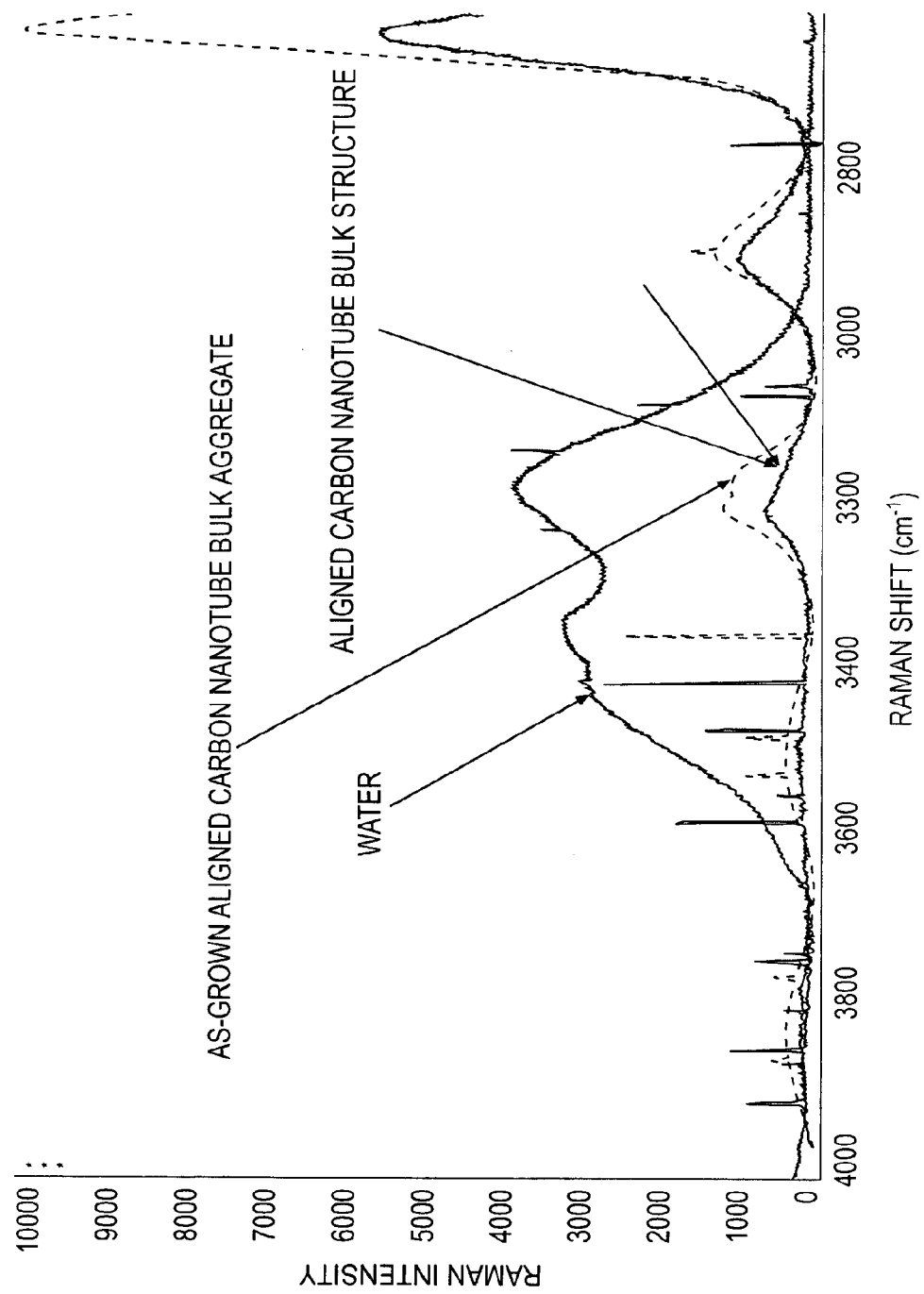
FIG. 10 shows Raman spectrum data after exposure of plural aligned carbon nanotubes to water followed by drying them.

Raman data of the high-density portion of the aligned carbon nanotube bulk structure having the high-density portion produced by exposing a part of plural aligned carbon nanotubes to water followed by drying are shown in FIG. 10 as one example. This drawing shows no water remaining in the dried bulk structure.

It is difficult to make a desired portion of the aligned carbon nanotube aggregate having a low density into the high-density state by merely exposing it to a liquid and drying. For example, even when an aligned carbon nanotube bulk aggregate merely grown on a substrate is exposed to a liquid and then dried, the density is increased in a not uniform island form (refer to Nirupama Chakrapani, et al. Capillarity-driven assembly of two dimensional cellular carbon nanotube foams, Proceedings of the National Academy of Sciences, 2004, Mar. 23, vol. 101, pp. 4009 to 4012). Further, direction of alignment is not uniform due to uneven increase of density.

Further, since density increase proceeds from a portion where the solution is in contact with the aligned carbon nanotube bulk aggregate, it is necessary to control the point of contact of the solution. Further, for restricting the density increasing portion to a desired region, it is necessary to strictly control the amount of the solution supplied from the point of contact. Therefore, it is necessary to adjust the rate of density increase. Unless they are not controlled, the portion to be increased in the density cannot be controlled, resulting in a problem that an aligned carbon nanotube bulk structure having a desired shape cannot be formed.

Then, for solving the problems, the followings are presented.

A) The rate of density increase was controlled by using a mixed solution of a solution having a high affinity with CNT and a solution having a low affinity therewith.

B) Density increase in the island shape was prevented by using the aligned carbon nanotube bulk aggregate separated from the substrate.

C) Integrity was improved by using an aligned carbon nanotube bulk aggregate having a height of 1 mm or more.

D) The point of contact and the amount of supply of the solution were controlled by using a pick the top end of which was dipped in the solution only at 2 to 3 mm thereof.

E) An aligned carbon nanotube bulk aggregate having a high aspect ratio was used by patterning an aligned carbon nanotube bulk aggregate.

F) A desired amount of the solution was supplied to the aligned carbon nanotube bulk aggregate by preparing a thin film of the solution on a substrate with a micro-pipette at a place away from the aligned carbon nanotube bulk aggregate on the substrate and controlling the forward or backward movement of the solution film by moving the micropipette upwardly and downwardly.

By adopting the method described above, an aligned carbon nanotube bulk structure of a desired shape and having a high-density portion and a low-density portion can be obtained.

The method of solution is to be described specifically.

A) In exposing an aligned carbon nanotube bulk aggregate to a solution, when a solution having a low affinity with CNT, such as water, is used, the rate of density increase tends to be extremely low and nonuniform. When a solution having a high affinity with CNT, such as an alcohol, is used, density is increased uniformly, but it involved a problem that the rate was high and restriction of the density increase to a desired portion was difficult.

Then, for solving the problem, a mixed solution of a solution having a high affinity with CNT and a solution having a low affinity with CNT was used. For example, a mixed solution of water and an alcohol can be referred to as an example. In using such a solution, the rate of density increase can be adjusted and the amount of solution supplied to the aligned carbon nanotube bulk aggregate could be controlled accurately.

B) In order to solve the problem, an aligned carbon nanotube bulk aggregate is not exposed to a liquid on a substrate used for growing but it is once peeled from the substrate, then exposed to the liquid, and dried. In a case where the aligned carbon nanotube bulk aggregate is present on the substrate used for growing, each of the CNTs is closely adhered to the substrate, and fixed at one end face to the substrate. Therefore, even when the density-increasing treatment is applied, CNT moves freely, the density cannot be increased, and the density is increased in the not uniform island form described previously. When the aligned carbon nanotube bulk aggregate is peeled from the substrate, since all CNTs can move freely, this is suitable for obtaining an aligned carbon nanotube bulk structure increased in the density and having desired form and shape.

C) An aligned CNT aggregate having a height (length of CNT) from several tens μm to hundred μm obtained by the existent CNT production process tended to be disintegrated when peeled from the substrate to result in a problem that peeling in an integrated shape was extremely difficult.

In order to solve the problem, an aligned carbon nanotube bulk aggregate with a height of 1 mm or more which was remarkably large scaled compared with the existent method by adding an extremely small amount of steams in the reaction atmosphere described in the Non-patent Document 1 was used. Further, in a case where the aligned carbon nanotube bulk aggregate contains much carbon impurity, adhesion with the substrate increases and the aggregate cannot be peeled as an integrated piece. In order to solve the problem, growing of the aligned carbon nanotube bulk aggregate was computed by the method of the patent document (Japanese Patent Application No. 2008-051321) and growing was interrupted when the growing rate was lowered. With such a procedure, deposition amount of the carbon impurity to the aligned carbon nanotube bulk aggregate can be minimized. Accordingly, an aligned carbon nanotube bulk aggregate in the grown state having low adhesion with the substrate and easily peelable as an integrated piece from the substrate could be obtained. The content of the carbon impurity can be estimated by the method described in the non-patent document, the Journal of Nano Letters, vol. 9, pp 769 to 773. It is preferred that the absolute purity of the aligned carbon nanotube bulk aggregate (weight of CNT in the entire weight) is 90% or more for lowering the adhesion with the substrate.

D) For controlling the point of contact of the solution, a pick was used. The pick was dipped at 2 to 3 mm of the top end into a mixed solution of water and an alcohol and impregnated with a controlled, extremely small amount of the solution. By bringing the top end of the pick into contact with a desired portion the low-density aligned carbon nanotube bulk aggregate separated from a substrate, a desired amount of the liquid could be supplied to the desired portion without deforming the structure of the aligned carbon nanotube bulk aggregate. The amount of the supplied liquid cannot be controlled, for example, by a fine metal wire. Further, in a case of dipping the pick entirely into the solution, an excessive supplied amount of the solution is. In a case where the amount of the supplied solution is insufficient, this step may be repeated for several times till a desired shape is obtained.

E) In using an aligned carbon nanotube bulk aggregate having a high aspect ratio by patterning the aligned carbon nanotube bulk aggregate, the solution can be supplied easily to a desired portion, and density increase in an island shape can be prevented.

F) The following method was used in order to supply a desired amount of the solution to a lower portion of the aligned carbon nanotube bulk aggregate having a high aspect ratio disposed on the substrate. That is, the top end of a micro-pipette is attached to a place apart by 5 mm or more from the aligned carbon nanotube bulk aggregate on the substrate. A mixed solution of water and an alcohol is provided from the pipette to the substrate to prepare a thin film on the substrate. The film of the solution moves forward little by little and prevails over the substrate. Then, it contacts with the lower portion of the aligned carbon nanotube bulk aggregate present apart and density increase proceeds. When the micro-pipette is detached from the substrate, the film of the solution moves backward and shrinks. By controlling the forward or backward movement, a desired amount of the solution is supplied to the aligned carbon nanotube bulk aggregate.

In the density-increasing treatment described above, while the method of exposing the aligned carbon nanotube bulk aggregate to the liquid and then drying the same was adopted, it is estimated that the mechanism where the aligned carbon nanotube bulk aggregate shrinks in the density-increasing treatment is attributable to that CNTs are attracted to each other by the surface tension of a liquid intruding between the CNTs, and the state where the CNTs are bound to each other is maintained also after evaporation of the liquid. Accordingly, any method of causing such surface tension between CNTs may be used for the density-increasing treatment and, for example, a method of using steams at a high temperature, etc. can be adopted.

As shown in FIG. 9, when a part of the aligned carbon nanotube bulk aggregate as-grown is exposed to liquid and thereafter dried, it is known that the part is shrunk, and for example, it forms a high-density portion having a density of about 20 times higher than the density before exposure to liquid. In addition, it is also known that when the starting point for exposure to liquid is varied in aligned carbon nanotube aggregates having the same shape, then they give quite different shapes. The shrinkage depends on the aspect ratio (length/width ratio) of the aligned carbon nanotube bulk aggregate before exposure to liquid and on the existence and the profile of the surface thereof. Further, when a columnar aligned carbon nanotube bulk aggregate having a small aspect ratio is exposed to liquid and thereafter dried, then it forms voids running along the axis thereof. A columnar aligned carbon nanotube bulk aggregate having a large aspect ratio is extremely influenced by the shrinkage starting point. Taking such various conditions into consideration, an aligned carbon nanotube bulk structure having any desired shape and having a high-density portion and a low-density portion can be produced.

Application examples of the aligned carbon nanotube bulk structure of the present invention are shown below, to which, needless-to-say, the invention should not be limited.

<1> CNT brush
<2> Contact of commutator
<3> Axis of commutator

The high-density portion of the aligned carbon nanotube bulk structure of the present invention has an extremely large density and a high hardness as compared with conventional aligned carbon nanotube bulk aggregates or structures. Further, in the aligned carbon nanotube bulk structure having the high-density portion and the low-density portion, the high-density portion and the low-density portion have various properties and characteristics such as ultra high purity, ultra heat conductivity, high specific surface area, excellent electronic and electric properties, optical properties, ultra mechanical strength, ultra high density, etc., respectively; and therefore, they can be applied to various technical fields as mentioned below.

EXAMPLES

Examples are shown below, and described in more detail. Needless-to-say, the present invention should not be limited to the following Examples.

Example 1

While the properties of the low density aligned carbon nanotube bulk aggregate produced in this example depend on details of production conditions, under the production conditions to be described later, typical values for a high-density portion include a single-walled CNT content of 99% (ratio for the number of single-walled CNTs relative to double-walled CNT and multi-walled CNT, obtained by observation of a single-walled aligned CNT aggregate by a transmission type electron microscope and determination based on the image), a density of 0.57 g/cm$^3$, a G/D ratio of 2.5 to 40, a BET-specific surface area of 1000 m$^2$/g, an average outer diameter of 2.8 nm, a half-width value of 2 nm, a carbon purity of 99.9%, an absolute purity of 98%, and an Herman's Orientation Factor of 0.3 to 0.7.

Typical values for a low-density portion include a single-walled CNT content of 99% (ratio for the number of single-walled CNTs relative to 2-walled CNT and multi-walled CNT, obtained by observation of a synthesized single-walled aligned CNT aggregate by a transmission type electron microscope and determination based on the image), a density of 0.029 g/cm$^3$, a G/D ratio of 2.5 to 40, a BET-specific surface area of 1150 m$^2$/g, an average outer diameter of 2.8 nm, a half-width value of 2 nm, a carbon purity of 99.9%, an absolute purity of 98%, and an Herman's Orientation Factor of 0.3 to 0.7.

Further, the low-density portion and the high-density portion are bound while maintaining an integral structure at the boundary.

An aligned carbon nanotube aggregate was grown through CVD under the condition mentioned below.

Carbon compound: ethylene, feeding speed 100 sccm

Atmosphere (gas) (Pa): helium/hydrogen mixed gas, feeding speed 1000 sccm, one atmospheric pressure Water vapor amount added (ppm): 150 ppm Reaction temperature (° C.): 750° C.

Reaction time (min): 10 min

Metal catalyst (existing amount): thin iron film, thickness 1 nm

Substrate: silicon wafer

A sputtering vapor deposition device was used for disposing the catalyst on the substrate; and an iron metal having a thickness of 1 nm was disposed through vapor deposition.

Further, in a case where the aligned carbon nanotube bulk aggregate of a low-density contains a lot of carbon impurities, its adhesion with the substrate increases to be an integrated piece and it is no more peeled from the substrate. For solving the problem, growing of the aligned carbon nanotube bulk aggregate was computed by the method described in the patent document (JP-A No. 2008-051321) and the growing was interrupted at the instance the growing rate was lowered. By the method described above, a low-density aligned carbon nanotube bulk aggregate having a shape of 1 mm height and 1 cm$^2$ square was obtained. For more detailed production conditions and production apparatus, see the patent document (U.S. Ser. No. 12/318,443) or (U.S. Ser. No. 11/658,577).

A portion of the low density aligned carbon nanotube bulk aggregate that was not increased in the density forms a low-density portion of the aligned carbon nanotube bulk structure having a low-density portion and a high-density portion according to the invention.

While the properties of the low density aligned carbon nanotube bulk structure obtained as described above depend on the details of production conditions, typical values are as described above.

Figure 12:
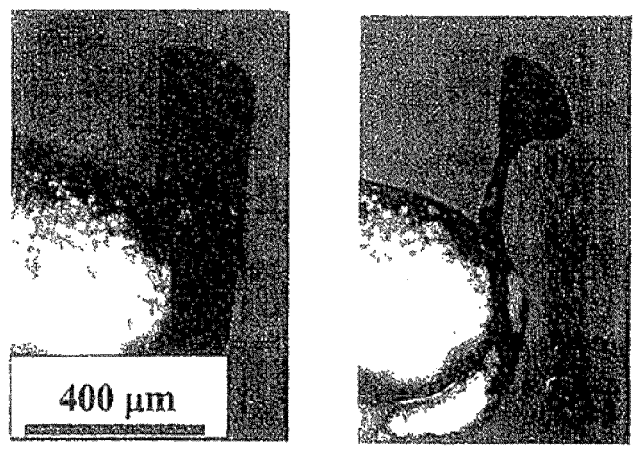
FIG. 12 shows a structure of the CNT brush of Example 1.

Next, the aligned carbon nanotube aggregate produced in the above was peeled from the substrate, using tweezers, and then cleaved by hand and using tweezers, in such a manner that the alignment direction could be in the lengthwise direction, thereby working it to have a shape of rod; and then the lower part of the rod was picked up with tweezers. The part picked up with tweezers was exposed to an extremely minor amount of water so that only the water-exposed part could be shrunk and densified to have a high density, and thereafter this was put on a hot plate kept at 170° C. and dried thereon. Accordingly, a CNT brush comprising the aligned carbon nanotube bulk structure of the present invention was produced, as in FIG. 12, in which the high-density portion is a handle and the low-density portion not wetted with water is a brush top and the two portions bond to each other with keeping the integrated structure in the interface thereof.

A method of supplying the mixed solution using a pick is as described below. A pick was dipped momentarily at 2 to 3 mm of the top end thereof in a mixed solution of water and an alcohol and impregnated with a controlled, extremely small amount of the solution. When the top end of the pick was brought into contact with the low density aligned carbon nanotube bulk aggregate peeled from the substrate, at the portion thereof seized by tweezers, an extremely small amount of the liquid could be supplied without deforming the structure of the aligned carbon nanotube bulk aggregate. The amount of the supplied liquid cannot be controlled by using, for example, a fine metal wire. Further, when the pick is entirely dipped into the solution, an excessive supplied amount of the solution is. In a case where the amount of the supplied solution is insufficient, this step may be repeated for several times till a desired shape is obtained.

The characteristics of the high-density portion (handle) and the low-density portion (brush top) of the thus-obtained aligned carbon nanotube bulk structure (CNT brush) are shown in Table 1, as compared with each other.

TABLE 1

|  | Low-Density Portion | High-Density Portion |
| --- | --- | --- |
| Density (g/cm$^3$) | 0.029 | 0.57 |
| Nanotube Density (number of nanotubes/cm$^2$) | $4.3 \times 10^{11}$ | $8.3 \times 10^{11}$ |
| Area per one nanotube | 234 nm$^2$ | 11.9 nm$^2$ |
| Coating Ratio | about 3% | 53% |
| Vickers Hardness | about 0.1 | 7 to 10 |

Figure 13:
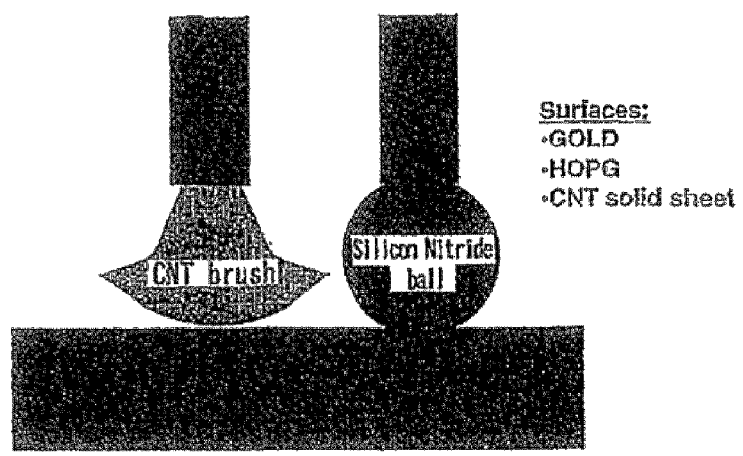
FIG. 13 is a conceptual view of a case of comparing the friction property of the CNT brush of Example 1 with that of a conventional silicon nitride ball.
Figure 14:
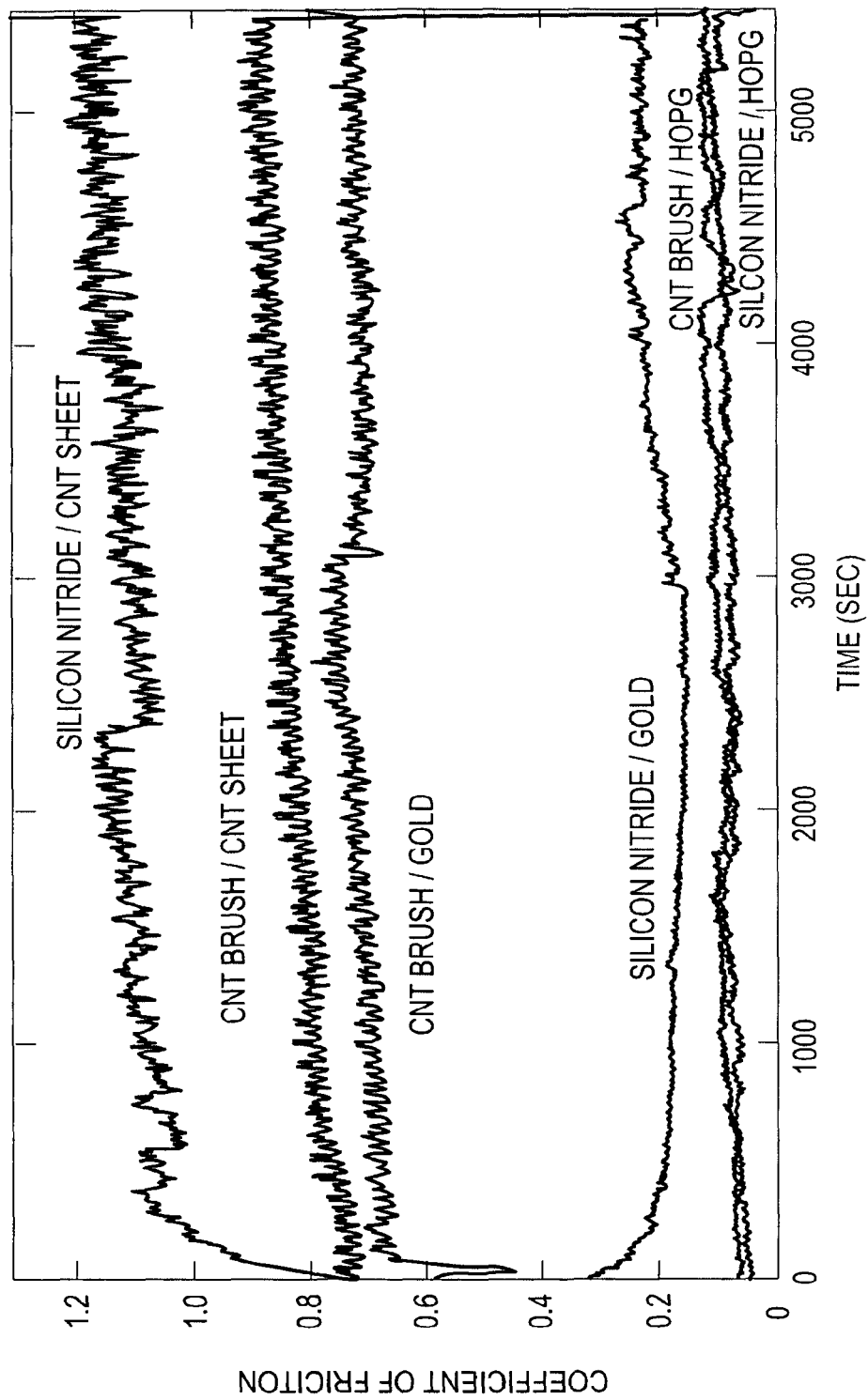
FIG. 14 is a graph showing the results of comparison between the friction property of the CNT brush of Example 1 and that of a conventional silicon nitride ball.

Next, the friction property of the CNT brush of Example 1 and that of a silicon nitride ball were investigated, as in the image of FIG. 13. Objects used for frictional investigation were gold, high oriented pyrolytic graphite (HOPG), and aligned carbon nanotube bulk sheet (high density). The results are shown in FIG. 14. The graph confirms the low-friction property of the CNT brush of Example 1.

Example 2

Electric Contact for Motor (Brush)

Figure 15:
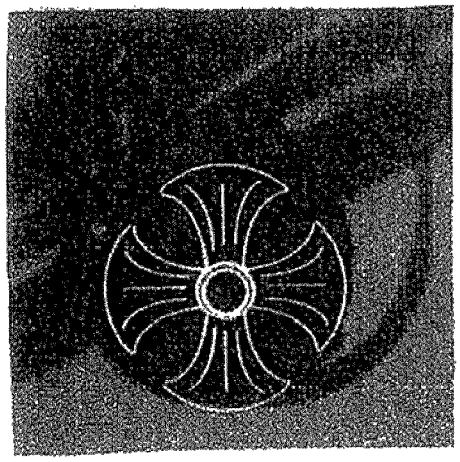
FIG. 15 shows the electric contact for motor in Example 2.
Figure 16:
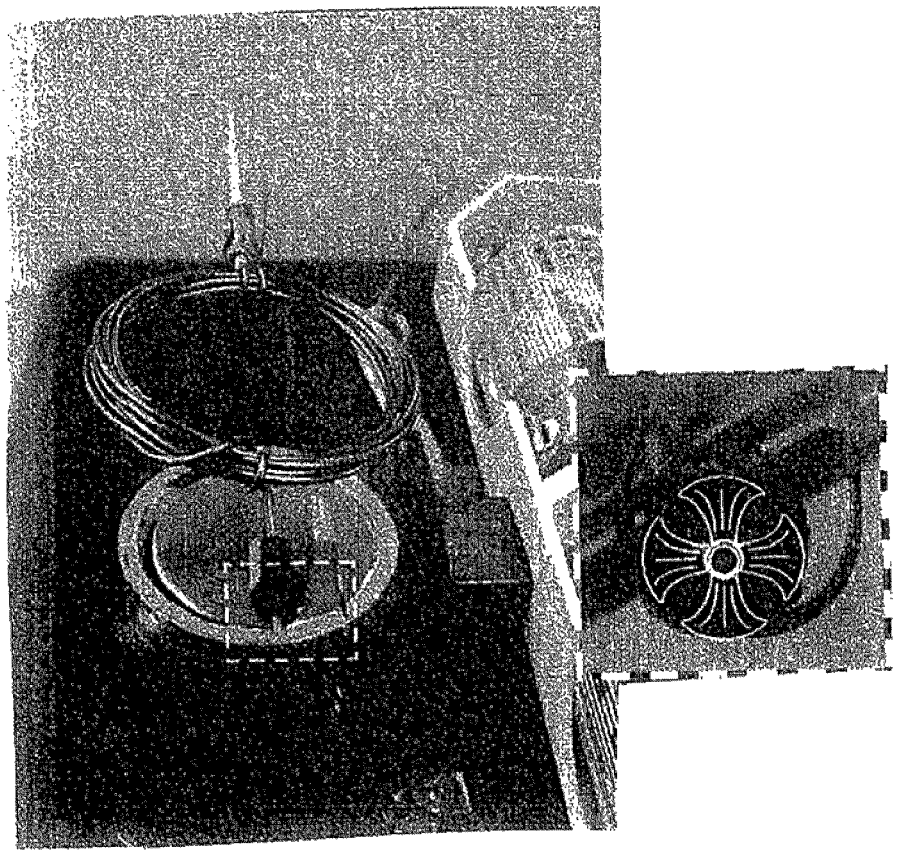
FIG. 16 is an explanatory view of a test with the electric contact for motor in Example 2.

In Example 1, the aligned carbon nanotube bulk aggregate as-grown was cut into strips with the alignment direction being the lengthwise direction thereof, and the center part of the strip was exposed to water and then dried to form a commutator having the shape shown in FIG. 15. The commutator comprises four fan-shaped parts, in which the center side of each fan-shaped part is a high-density portion and the peripheral side thereof is a low-density portion. This was tested as in the constitution shown in FIG. 16, which confirmed the role of the structure as an electric contact for good contact with a copper commutator at low friction therebetween. In this, the density of the high-density portion was 0.5 g/cm$^3$, and the density of the low-density portion was 0.03 g/cm$^3$. The electric contact for CNT motor may also play a role as the axis thereof.

Example 3

Figure 11:
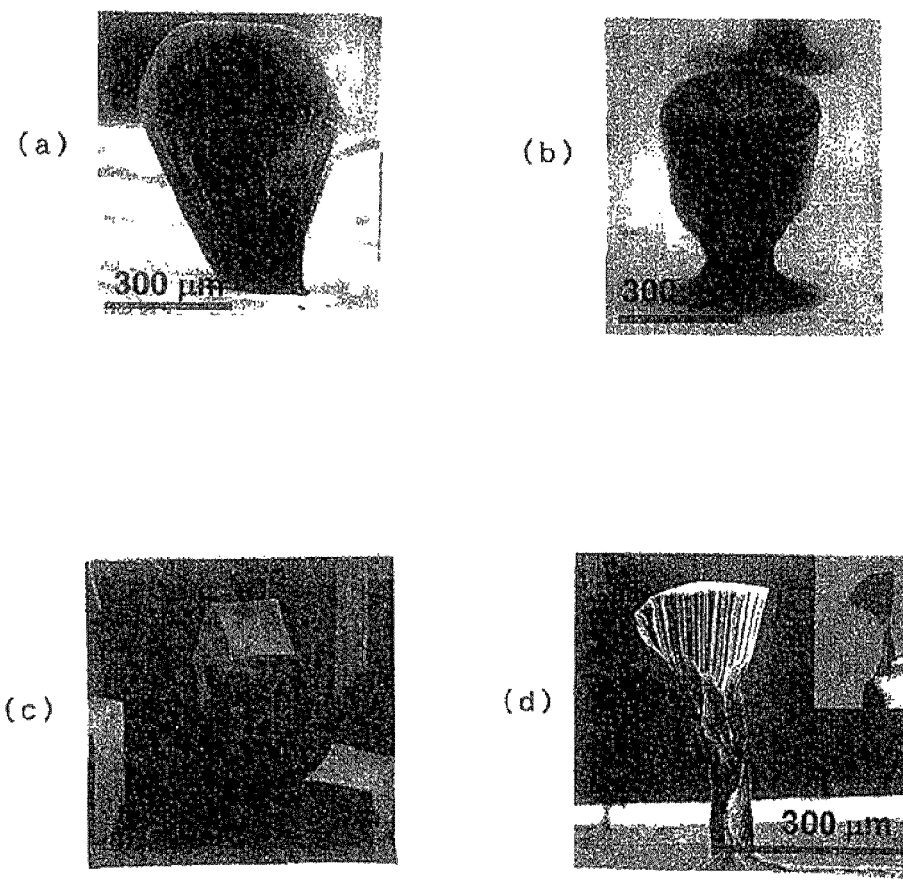
FIG. 11 shows some examples of the shape of an aligned carbon nanotube bulk structure.

FIG. 11 shows another embodiment of an aligned carbon nanotube bulk structure having a low-density portion and a high-density portion, and a production process therefor according to the present invention.

A catalyst was patterned by the method described in the patent document (U.S. Ser. No. 12/318,443) or the patent document (U.S. Ser. No. 11/658,577) and a patterned low density aligned carbon nanotube bulk structure of 1 mm height (hereinafter referred to as CNT film) was obtained according to the method of Example 1.

The low-density portion and the high-density portion in the aligned carbon nanotube bulk structure of this example have the same characteristics as those in Example 1.

a) A catalyst was patterned in a circular shape and carbon nanotubes were grown to synthesize an aligned carbon nanotube bulk aggregate of a pillar structure on a substrate. In this case, synthesis is conducted such that the degree of adhesion between the aligned carbon nanotube bulk aggregate and the substrate is low. Specifically, it may be kept in a synthesis furnace for several minutes after the growing. The surface of the substrate on which the aligned carbon nanotube bulk aggregate has been grown is wetted with an extremely small amount of a liquid, and the liquid is impregnated from a point where the aligned carbon nanotube bulk aggregate is in contact with the substrate to shrink and increase the density of the lower portion. In this case, the amount of the supplied liquid is controlled so that the upper portion is maintained in the low-density state after growing.

Since the inter-action between the substrate and the aligned carbon nanotube bulk aggregate is weak, the aligned carbon nanotube bulk aggregate is peeled from the substrate during shrinkage and a balloon-like aligned carbon nanotube bulk aggregate is formed as a structure.

b) The catalyst is patterned in a circular shape and carbon nanotubes are grown to synthesize an aligned carbon nanotube bulk aggregate of a pillar structure on the substrate. In this case, synthesis is conducted such that the degree of adhesion between the aligned carbon nanotube bulk aggregate and the substrate is high. Specifically, after the growing, the substrate may be taken out under rapid cooling from the synthesis furnace. The surface of the substrate on which the aligned carbon nanotube bulk aggregate has been grown is wetted with an extremely small amount of the liquid, and the liquid is impregnated from a point where the aligned carbon nanotube bulk aggregate is in contact with the substrate to shrink and increase the density of the lower portion. In this case, the amount of the supplied liquid is controlled so that the upper portion is maintained in the low-density state after growing.

Since the inter-action between the substrate and the aligned carbon nanotube bulk aggregate is strong, the aligned carbon nanotube bulk aggregate is held on the substrate even during shrinkage, and a mortar-like aligned carbon nanotube bulk aggregate is formed as a structure.

c) A structure is formed by applying the same procedures as those in (b) to the square-shape aligned carbon nanotube bulk aggregate.

The method of controlling the amount of the supplied liquid is as described below. As the liquid, a mixed solution of water and an alcohol was used. That is, a top end of a micro-pipette containing the mixed solution of water and an alcohol was attached to a place on a substrate spaced apart by 5 mm from the aligned carbon nanotube bulk aggregate. The mixed solution of water and the alcohol was provided from the pipette to the substrate to prepare a thin film on the substrate. The film of the solution moves forwardly little by little and prevails on the substrate. Then, it contacts with the lower portion of the aligned carbon nanotube bulk aggregate present apart, and density increase proceeds. When the micro-pipette was detached from the substrate, the film of the solution moves backwardly and shrinks. By controlling the forward or backward movement, a desired amount of the solution is supplied to the aligned carbon nanotube bulk aggregate.

d) The aligned carbon nanotube bulk aggregate is peeled from the substrate by using tweezers, and cleaved such that the alignment direction is uniform in the longitudinal direction by using fingers and tweezers, to thereby fabricate into a bar-like configuration, the lower portion of the bar is seized by the tweezers, and exposed to an extremely small amount of the mixed solution of water and the alcohol according to the method of Example 1 so that only the portion exposed to the mixed solution of water and the alcohol is shrunk and increased in the density and then dried by being placed on a hot plate maintained at a temperature of 170° C.

As described above, a patterned aligned carbon nanotube bulk structure of a desired shape and having with a low-density portion and a high-density portion can be obtained.

Evaluation for the purity, the alignment, and the specific surface area of the aligned carbon nanotube bulk structure provided with the low-density portion and the high-density portion obtained in Examples 1 to 3 is described below.

While the low-density portion and the high-density portion according to the invention have substantially identical purity, alignment, and specific surface area, they may be different depending on the application uses.

(Purity of Aligned CNT Aggregate)

The carbon purity of the aligned carbon nanotube bulk aggregate was determined based on the result of the elemental analysis using fluorescent X-rays. According to the elemental analysis by fluorescent X-rays, carbon was 99.9%, iron was 0.013%, and no other elements were measured. As a result, the carbon purity was measured as 99.9%.

Further, the absolute purity estimated by the method described in the non-patent document, the Journal of Nano Letters, vol. 9, pp 769 to 773, was 98%.

(Evaluation for Alignment According to $\theta$-$2\theta$ Method)

The degree of alignment of the obtained aligned carbon nanotube bulk aggregate was evaluated by an X-ray diffractiometry according to the $\theta$-$2\theta$ method. X-ray diffraction spectrum for the high-density portion of this sample are as shown in FIG. 2 to FIG. 3. The observed diffraction peaks reflect the periodicity of the constitution of a carbon six-membered ring constituting the single-walled CNT and the periodicity of a packing between the single-walled CNTs. A (CP) diffraction peak observed at a low angle (0 to 15°) reflects the spacing between single-walled CNTs. A moderate diffraction peak observed near 25° reflects the spacing between carbon six-membered ring sheets of different single-walled CNTs. A diffraction peak near 42° reflects the (100) plane and the diffraction peak near 77 to 78° reflects the (110) plane of the carbon six-membered ring of the single-walled CNT. Since the carbon six-membered structure of CNT is rounded and curved, the carbon six-membered structure of the single-walled CNT does not closely aggregate with diffraction peak of graphite. Further, while peak positions change somewhat depending on the size and the degree of alignment of the single-walled CNT, the diffraction peaks can be identified. The X-ray diffraction spectrum are identical also for the low-density portion, although the intensity of each of the peaks is different.

When the Herman's orientation coefficient F was calculated based on the result, the (CP) diffraction peak was 0.4 to 0.62 for the low-density portion and 0.62 for the high-density portion. For the (002) diffraction peak, it was 0.75 for the low-density portion and the high-density portion.

(Evaluation for Alignment According to the Laue Method)

The degree of alignment of the obtained aligned carbon nanotube bulk structure was evaluated by X-ray diffractiometry according to the Laue method.

As a result, the observed diffraction peaks at (CP), (002), (100), etc. for the aligned carbon nanotube bulk structure were in an elliptic shape and showed anisotropy. The anisotropy exhibits that the single-walled CNT is aligned.

When the Herman's orientation factor F was calculated from the result, the (CP) diffraction peak was 0.38 for the low-density portion and 0.74 for the high-density portion, and the (002) diffraction peak was 0.61 for the low-density portion and 0.72 for the high-density portion.

The aligned carbon nanotube bulk structure was observed by a scanning type electron microscope (SEM) and FET images were calculated based on the observed SEM image. The FFT images showed anisotropy respectively although the degree was different depending on the magnification factor and the place in the SEM image. This shows that CNTs in the structure are aligned.

A transformation intensity was determined from the reference direction ($\phi=0$) to $\phi=\pi/2$ in the radial direction while keeping an equal distance from the original point of the FET image to obtain an intensity profile. When the Herman's orientation factor F was calculated by using the intensity profile, values of 0.3 to 0.6 were obtained in the low-density portion and the high-density portion to reveal that the aligned carbon nanotube bulk structure was aligned.

Using Nippon Bell's BELSORP-MINI, adsorption/desorption isothermal curves of liquid nitrogen at 77K were measured for 50 mg of the aligned carbon nanotube bulk aggregate (the adsorption equilibrium time: 600 sec). The entire adsorption amount showed an extremely large value (742 mL/g). When the specific surface area was computed based on the adsorption/desorption isothermal curves, it was 1100 $m^2/g$.

The adsorption/desorption isothermal curves for unopened aligned carbon nanotube bulk aggregate showed a high linearity in a region of a relative pressure of 0.5 or lower. $\alpha_s$ plotting also showed a linearity in the region of 1.5 or lower. The results of measurement exhibit that CNTs constituting the aligned carbon nanotube bulk aggregate are not opened.

Figure 17:
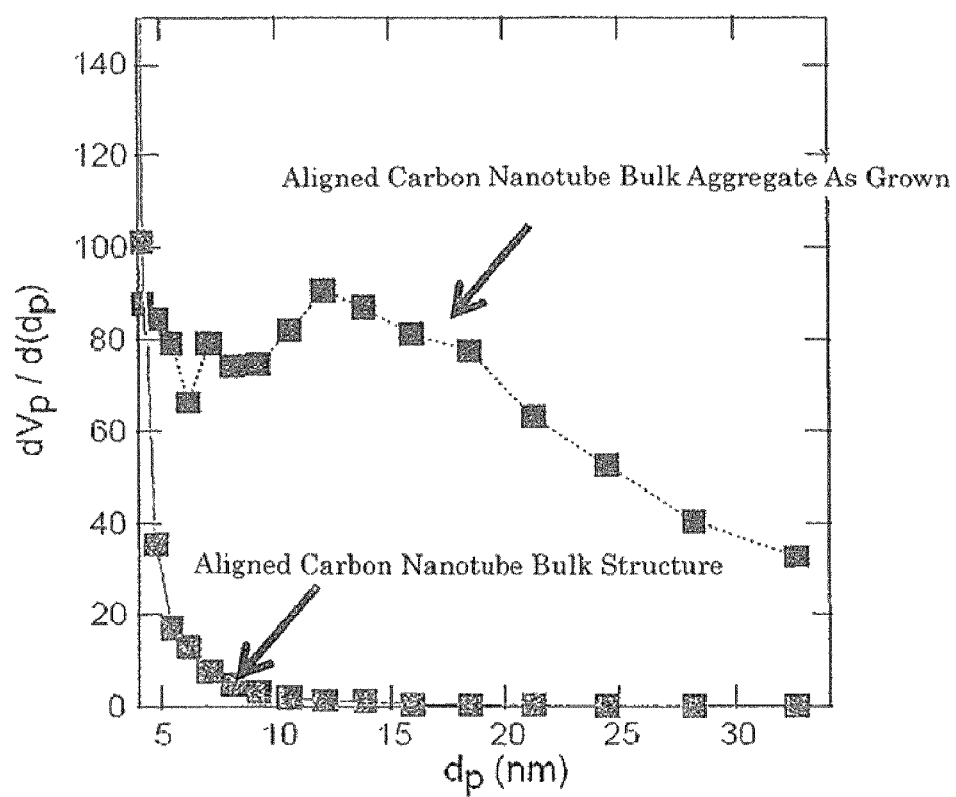
FIG. 17 shows micropores distribution obtained by BJH method.

The distribution of pore diameter in the high-density portion and the low-density portion was determined according to the BJH method based on the adsorption/desorption isothermal curves of liquid nitrogen at 77K. As shown in FIG. 17, the distribution maximum of pore diameter in the high-density portion is 5 nm or less and it can be seen that the fine pore diameter distributes mainly at 10 nm or less. This shows that the spacing (pore) between neighboring single-walled CNTs in the aligned carbon nanotube bulk aggregate having such a distribution of pore diameter is 10 nm or less, CNTs are tilled at a high-density, and pores or voids at micro-scale are scarcely present. Such portion exhibits a phase as a so-called "solid" and can be used suitably, for example, as a member of a shank of a brush.

In the low-density portion, the pare diameter is within a range of 5 nm to 100 nm, which exhibits that a number of spacing (pores) of 3 nm to 100 nm are present between neighboring single-walled CNTs. The portion forms a material of a soft feeling and can be used suitably, for example, as a brush-like member.

Further, 50 mg of the aligned carbon nanotube bulk aggregate was peeled off by tweezers, arranged uniformly on a tray made of alumina and placed in a muffle furnace. Then, a heat treatment was conducted while elevating the temperature up to 500° C. at 1° C./min in oxygen (about 20% concentration) at 500° C. for one min. The weight of the specimen after the heat treatment was 50 mg, and the weight was substantially the same even after the heat treatment. In the same manner as described above, adsorption/desorption isothermal curves of liquid nitrogen (FIG. 4) were computed for the specimen after the heat treatment in the same manner as described above. As a result, when the specific surface area was estimated, it was about 1900 $m^2/g$. The specimen after the heat treatment had a larger specific surface area compared with the specimen before the heat treatment and it was suggested that the top end of the carbon nanotube was opened by the heat treatment. In the drawing, P represents an adsorption equilibrium pressure and $P_0$ represents a saturation vapor pressure.

The invention claimed is:

1. An aligned carbon nanotube bulk structure comprising a plurality of carbon nanotubes (CNTs) having a high density portion and a low density portion, and having alignment in one direction in which the high density portion has a weight density of 0.3 to 1.5 $g/cm^3$ and the low density portion has a weight density of 0.001 to 0.2 $g/cm^3$, wherein the high density portion has a specific surface area of 800 to 2600 $m^2/g$ and a purity of 98% or more measured by fluorescence X-rays, and wherein the alignment of the plurality of the carbon nanotubes comprising the high density portion and the low density portion is defined by at least one of the following conditions;

1) in a case of measuring an X-diffraction intensity by irradiating X-rays from a first direction and a second direction perpendicular to the first direction (a $\theta$-$2\theta$ method), an angle $\theta$ and a reflection azimuth at which the reflection intensity from the second direction is higher than the reflection intensity from the first direction are present, and an angle $\theta$ and a reflection azimuth at which the reflection intensity from the first direction is higher than the reflection intensity from the second direction is present, in which the first direction is an alignment direction of the CNT or a direction perpendicular to the alignment direction of the CNT, and the second direction is a direction perpendicular to the alignment direction of the CNT or the alignment direction of the CNT, 2) a diffraction peak pattern exhibiting the presence of anisotropy appears in a case of measuring an X-ray diffraction intensity by a 2-dimensional diffraction pattern image obtained by irradiating X-rays from a direction perpendicular to the alignment direction of the CNT (a Laue method), and 3) a Herman's orientation factor is larger than 0 and smaller than 1 when using the X-ray diffraction intensity obtained according to the $\theta$-$2\theta$ method or the Laue method.

2. The aligned carbon nanotube bulk structure according to claim 1, wherein the alignment direction of the CNT in the high density portion is different from the alignment direction of the CNT in the low density portion.

3. The aligned carbon nanotube bulk structure according to claim 1, wherein the high density portion and the low density portion are disposed uniformly.

4. The aligned carbon nanotube bulk structure according to claim 1, further comprising an intermediate density portion having a density between the density of the high density portion and the low density portion.

5. The aligned carbon nanotube bulk structure according to claim 1, wherein the density stepwise changes between the lowermost limit density and the uppermost limit density of the high density portion and between the uppermost limit density and the lowermost limit density of the low density portion.

6. The aligned carbon nanotube bulk structure according to claim 1, wherein a pore diameter determined by a BJH method at the high density portion is within a range of 10 nm or less, and the pore diameter determined by the BJH method at the low density portion is within a range of 5 nm to 100 nm.

* * * * *